(12) United States Patent
Heitplatz

(10) Patent No.: US 8,771,134 B2
(45) Date of Patent: Jul. 8, 2014

(54) FRICTION WHEEL DRIVE

(75) Inventor: Heino Heitplatz, Drensteinfurt (DE)

(73) Assignee: Beumer GmbH & Co. KG, Beckum (DE)

( * ) Notice: Subject to any disclaimer, the term of this patent is extended or adjusted under 35 U.S.C. 154(b) by 133 days.

(21) Appl. No.: 13/144,894

(22) PCT Filed: Dec. 3, 2010

(86) PCT No.: PCT/DE2010/001408

§ 371 (c)(1),
(2), (4) Date: Nov. 7, 2011

(87) PCT Pub. No.: WO2011/085705

PCT Pub. Date: Jul. 21, 2011

(65) Prior Publication Data

US 2012/0277057 A1  Nov. 1, 2012

(30) Foreign Application Priority Data

Jan. 18, 2010 (DE) .......................... 10 2010 004 858

(51) Int. Cl.
*F16H 13/00* (2006.01)
*F16H 13/10* (2006.01)
*F16H 55/32* (2006.01)
*F16H 57/00* (2012.01)

(52) U.S. Cl.
USPC .............................................. 476/61; 476/67

(58) Field of Classification Search
CPC ....... B65G 47/962; B65G 35/00; B65G 23/12
USPC ............... 476/61, 62, 67; 198/867.13; 105/30
See application file for complete search history.

(56) References Cited

U.S. PATENT DOCUMENTS 5,938,006 A * 8/1999 Fisher .......................... 198/831
6,840,886 B2 * 1/2005 Ohara .............................. 476/67

FOREIGN PATENT DOCUMENTS

| DE | 874851 C | 4/1953 |
| DE | 1036595 B | 8/1958 |
| DE | 3905345 A1 | 7/1989 |
| EP | 1036754 A1 | 3/1999 |
| JP | 11 227916 | 8/1999 |
| JP | 11 227916 A | 8/1999 |
| NL | 30 023 C | 6/1933 |
| WO | WO-95/34492 A2 | 12/1995 |
| WO | WO 2009/096893 A1 | 8/2009 |

\* cited by examiner

*Primary Examiner* — David M Fenstermacher
*Assistant Examiner* — Jake Cook
(74) *Attorney, Agent, or Firm* — Fulbright & Jaworski LLP

(57) ABSTRACT

The invention is directed to a friction wheel drive with a driving roller capable of being driven in a rotary manner, which is mounted on a bearing unit so as to be rotatable about an axis of rotation. The bearing unit is displaceably guided transversely to the axis of rotation, and a circumferential surface of the driving roller can be brought into driving engagement with a friction surface. The bearing unit is coupled to a first mechanical forced guidance system, by which the driving roller, responding to a driving force acting in a first direction, can be automatically pressed against the friction surface with a contact pressing force that increases as the driving force increases. The bearing unit is also coupled to a second mechanical forced guidance system, by which the driving roller, responding to a driving force acting in an opposite second direction, can be automatically pressed against the friction surface with a contact pressing force that increases as the driving force increases.

6 Claims, 23 Drawing Sheets

FRICTION WHEEL DRIVE

CROSS-REFERENCE TO RELATED APPLICATIONS

This application is a notional stage application of PCT/DE2010/001408 filed Dec. 3, 2010, claiming priority from Application DE 102010004858.5-12 filed on Jan. 18, 2010 in Germany.

TECHNICAL FIELD

The invention relates to a friction wheel drive for transmitting driving forces in changing directions, such as in handling and conveying equipment. Drives of this kind are known and have the disadvantage, among other things, that the contact pressing force of the driving rollers has to be set relatively high in order to make it possible to transmit the maximum drive forces to be expected, without excessive slip. This results in unnecessary wear and poor efficiency.

BACKGROUND OF THE INVENTION

The problem of the invention consists in improving a friction wheel drive, which is known per se, in which a circumferential surface of a driving roller co-operates with a friction surface, in such a way that the transmission of driving and braking forces of varying magnitudes in both directions is in each case possible by automatically increasing the contact pressing force of the driving roller to a degree appropriate to the coefficient of friction.

BRIEF SUMMARY OF THE INVENTION

A friction wheel drive of this kind is advantageous in that the contact pressing force with which the driving roller is pressed against the friction surface is not laid down permanently, such as in line with the maximum drive force to be expected, but is instead adapted, automatically and independently of the direction of drive, to the driving force to be transmitted, or the torque to be transmitted, so that on the one hand, acceptable slip is not exceeded and on the other hand, unnecessarily great pressing forces are avoided, which would otherwise reduce the efficiency of the drive and cause unnecessary wear.

The first and/or the second forced guidance may take the form of a first and/or second mechanical coupling member linking the bearing unit to a mount, relative to which the bearing unit is guided so as to be displaceable transversely to the axis of rotation.

In particular, it is contemplated that displacement of the bearing unit parallel to the friction surface simultaneously and automatically produces a displacement of the bearing unit in the direction of the friction surface. The contact pressing force is preferably proportional to the driving force. It is preferably contemplated that the displacement in the direction of the friction surface is proportional to the displacement parallel to the friction surface.

In a first embodiment, it is contemplated that two two-armed pivot levers, which are arranged, in a rest position of the bearing unit with no drive force, on both sides of, in particular symmetrically to, a plane including the axis of rotation and perpendicular to the friction surface, with first lever arms on a pressing surface of the bearing unit parallel to the friction surface which can in each case be supported with a second lever arm on a transmission surface of the bearing unit running in each case perpendicularly to the friction surface (or substantially perpendicularly, where the difference compared to the vertical direction can correspond approximately to the friction angle of the friction pair pressure roller/friction surface). The pivot levers may be hinged to the mount.

In this context, it may be contemplated that the bearing unit is mounted to be pivotable about a swivelling axis arranged on a carriage which is displaceable perpendicularly to the friction surface and parallel to the axis of rotation of the driving roller.

In the process, the carriage may by guided to be displaceable either along a linear guide or about a swivelling axis perpendicular to the friction surface arranged parallel to the axis of rotation.

In a further embodiment, it may be contemplated that a pressure member can be pressed against a counter-surface opposite the friction surface, which is a further outer surface of a friction-drive body, parallel to the friction surface, where two two-armed pivot levers, which are arranged, in a rest position of the bearing unit with no drive force, on both sides of, in particular symmetrically to, a plane including the axis of rotation of the driving roller and perpendicular to the friction surface, with first lever arms on a transmission surface of the bearing unit arranged perpendicularly to the friction surface in each case and with second lever arms which can be supported on a pressing surface, running parallel to the friction surface, of a pressure body supporting the pressure member displaceably mounted perpendicularly to the counter-surface. The pivot levers may be hinged to the mount.

In this context, it may be contemplated that the bearing unit is guided to be displaceable along a linear guide aligned parallel to the friction surface or, perpendicularly to the friction surface, about a swivelling axis arranged parallel to the axis of rotation of the driving roller especially on a mount.

In this context, it may be contemplated that the bearing unit is guided to be displaceable along a linear guide aligned parallel to the friction surface or, perpendicularly to the friction surface, about a swivelling axis arranged parallel to the axis of rotation of the driving roller especially on a mount.

The pressure member may be spring-biased relative to the bearing unit.

In a further embodiment, it may be contemplated that the bearing unit is force-guided on a control surface, which is especially V-shaped in design, and which is arranged, in a rest position of the bearing unit with no drive force, on both sides of, in particular symmetrically to, a plane including the axis of rotation of the driving roller and running perpendicular to the friction surface, thus causing displacement of the bearing unit parallel to the friction surface simultaneously to displacement in the direction of the friction surface.

In this context, it may be contemplated that the bearing unit is displaceably guided along a first linear guide aligned parallel or perpendicular to the friction surface on a carriage which for its part is displaceably guided along a second guide aligned perpendicularly to the first linear guide, especially on the mount.

In a manner analogous to the embodiments described above, each of the linear guides may be replaced by a swivel bearing with a swivelling axis kept parallel to the axis of rotation of the driving roller, retained on the carriage or on the mount.

In one embodiment, it is contemplated that the bearing unit is mounted on a carriage that is displaceable perpendicularly to the friction surface so as to be pivotable about a swivelling axis arranged on the carriage and parallel to the axis of rotation of the driving roller, the carriage being force-guided along a control surface which is in particular arcuate in design, and which is arranged, in a rest position of the bearing unit with no drive force, on both sides of, in particular symmetrically to, a plane including the axis of rotation of the driving roller and running perpendicular to the friction surface, thus causing displacement of the bearing unit parallel to the friction surface simultaneously to displacement in the direction of the friction surface.

In this context, it may be contemplated that the carriage is guided to be displaceable perpendicularly to the friction surface along a linear guide aligned perpendicularly to the friction surface or about a swivelling axis arranged parallel to the axis of rotation of the driving roller, especially on a mount.

In the above-mentioned embodiments with two angle levers, it may be contemplated that the transmission surfaces are arranged in a V shape at an angle to the above-mentioned plane which, or whose arc tan value, corresponds to a length ratio of the first and second lever arms. The angle may be chosen such that a distance between transmission rollers of the first lever arms and the pressing surface and respective distances between transmission rollers of the second lever arms and the transmission surfaces remain substantially constant despite changes in the distance between the swivelling axis of the bearing unit and the swivelling axis of the pivot levers.

In the embodiments without a displaceable pressure body, it may be contemplated that a pressure member which is retained on the mount and which can be pressed against a counter-surface opposite the friction surface, which is a further outer surface of a friction-drive body, parallel to the friction surface, is spring-biased relative to the bearing unit.

In addition, it may be contemplated that the bearing unit and/or the pressure body is/are displaceably guided about a swivelling axis perpendicular to the friction surface, and it may be contemplated that the swivelling axis coincides with a swivelling axis on which a mount is hinged to a frame so as to be swivellably movable.

BRIEF DESCRIPTION OF THE DRAWINGS

Further advantages and features of the invention will become clear from the following description of several worked embodiments, reference being made to a drawing in which.

DETAILED DESCRIPTION OF THE INVENTION

FIGS. 1 to 5 show different views of a first embodiment of a friction wheel drive of the invention, which, in the application illustrated, is used to drive individual carriages of a conveyor means.

Figure 2:
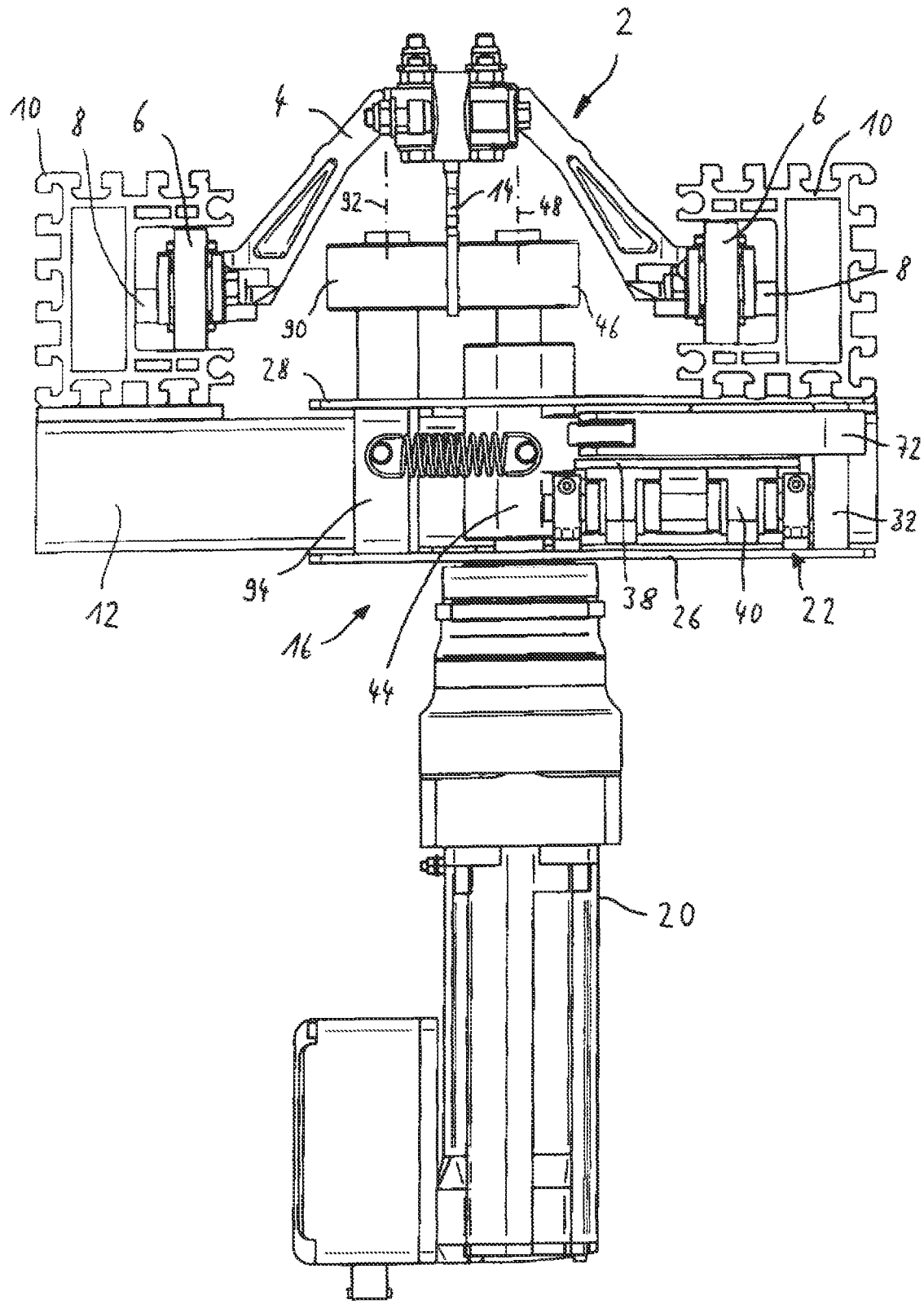
FIG. 2 shows a view of the first embodiment, seen from the front.
Figure 3:
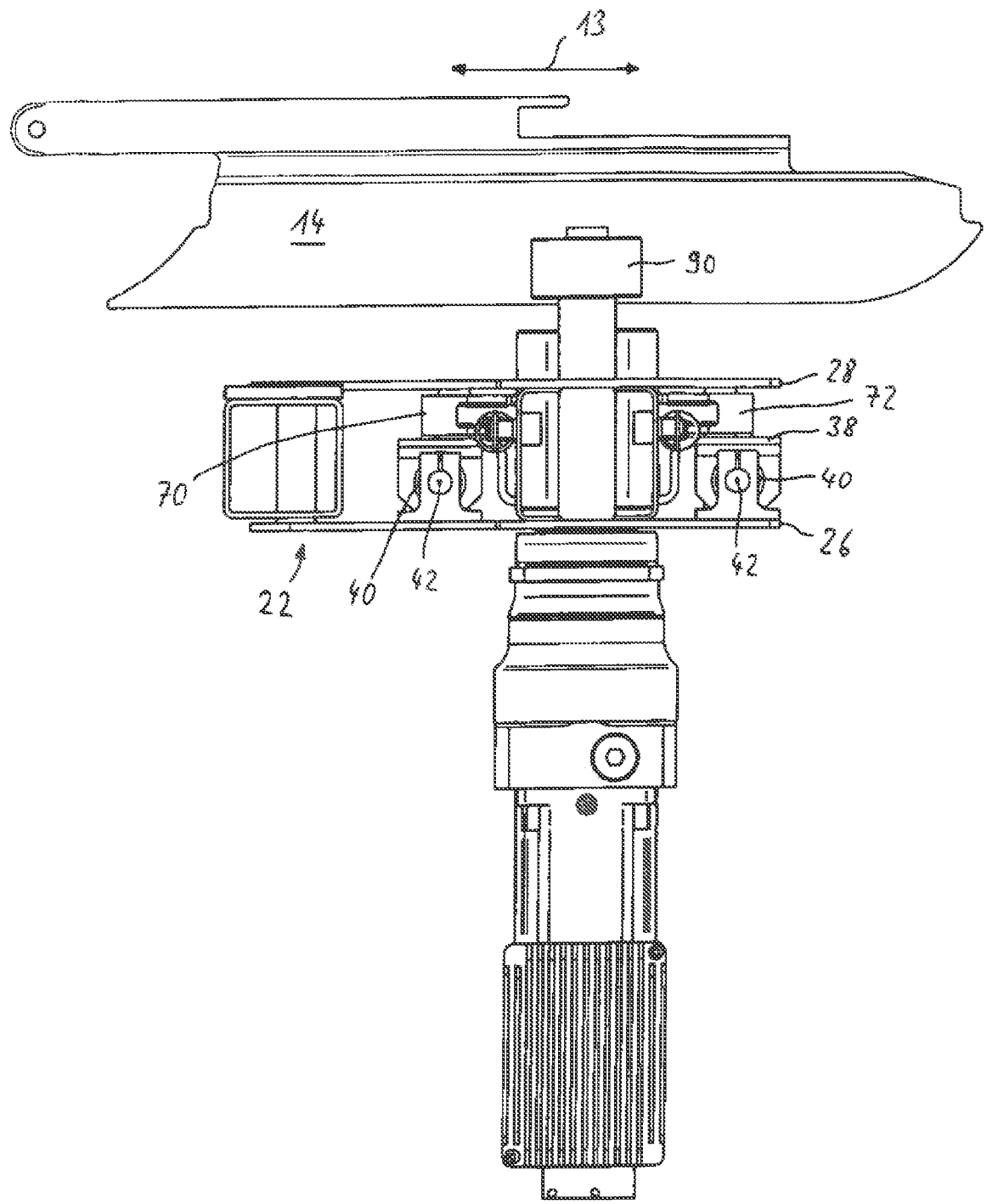
FIG. 3 shows a side view of the first embodiment.
Figure 4:
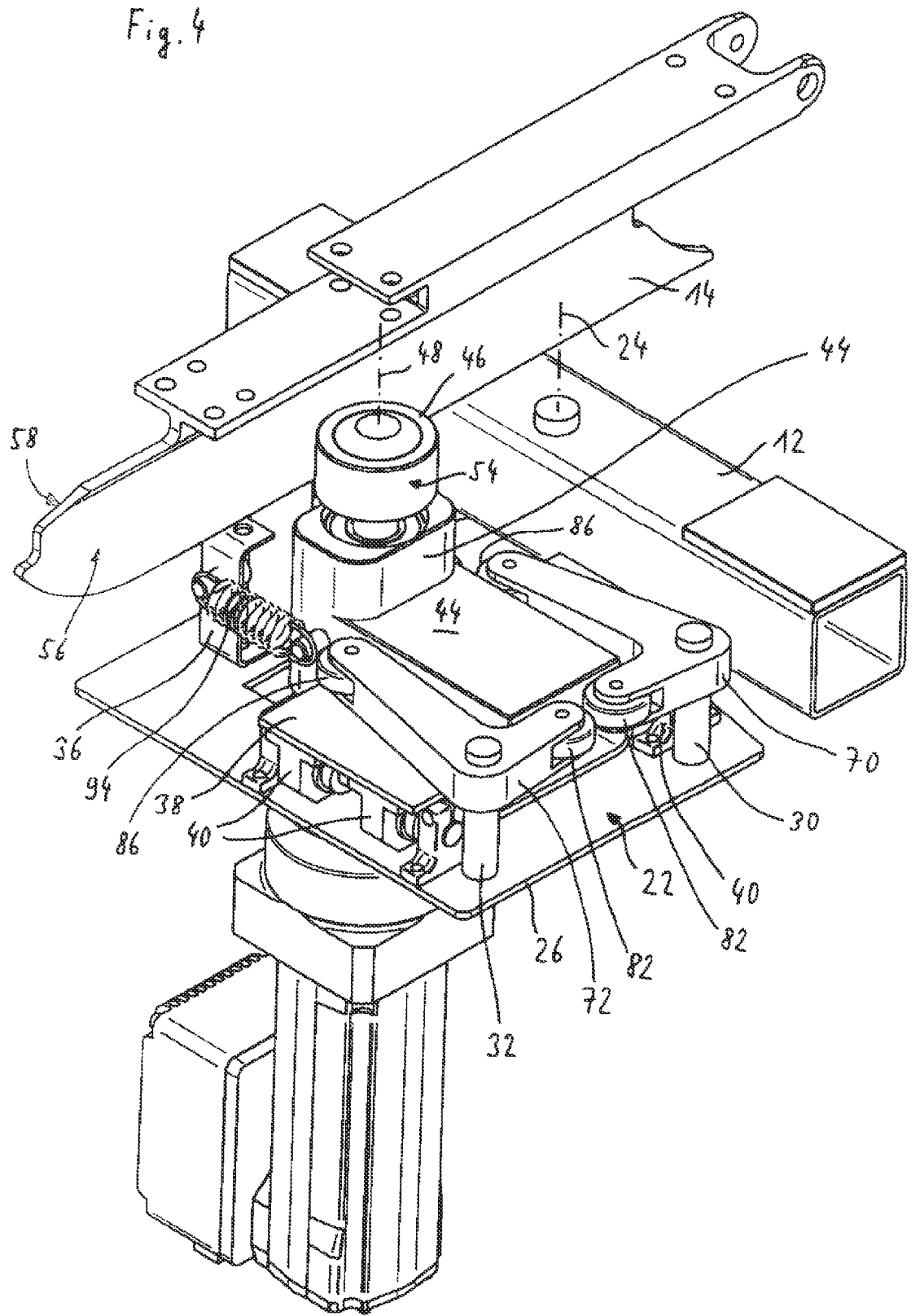
FIG. 4 shows a perspective view of the first embodiment from one direction.

FIG. 2 shows a schematic view, from the front, of an individual carriage 2 of a conveyor means, which has a chassis 4 on which are mounted support rollers, or idlers, 6, which are rotatable about horizontal axes, and guide rollers 8, which are rotatable about vertical axes. The support and guide rollers 6, 8 run substantially without play in a pair of guide rails 10, which are fixed parallel and spaced apart on a supporting frame 12, so that the carriages can be moved in a longitudinal direction or conveying direction 13.

Fixed to each carriage 2 is a plate-like drive blade 14, which points vertically downwards and is aligned in the longitudinal direction 13, with the help of which a driving force acting in the longitudinal direction can be transmitted to the carriage 2 by means of a friction wheel drive 16.

Since a chain of carriages 2 is as a rule joint together by couplings and, in addition, each carriage 2 possesses a certain inertia, it is sufficient if at least one friction wheel drive 16 is disposed on the frame 12, or if a plurality of friction wheel drives 16 are disposed over the length of the conveyor means, spaced apart from one another to some extent.

Figure 1:
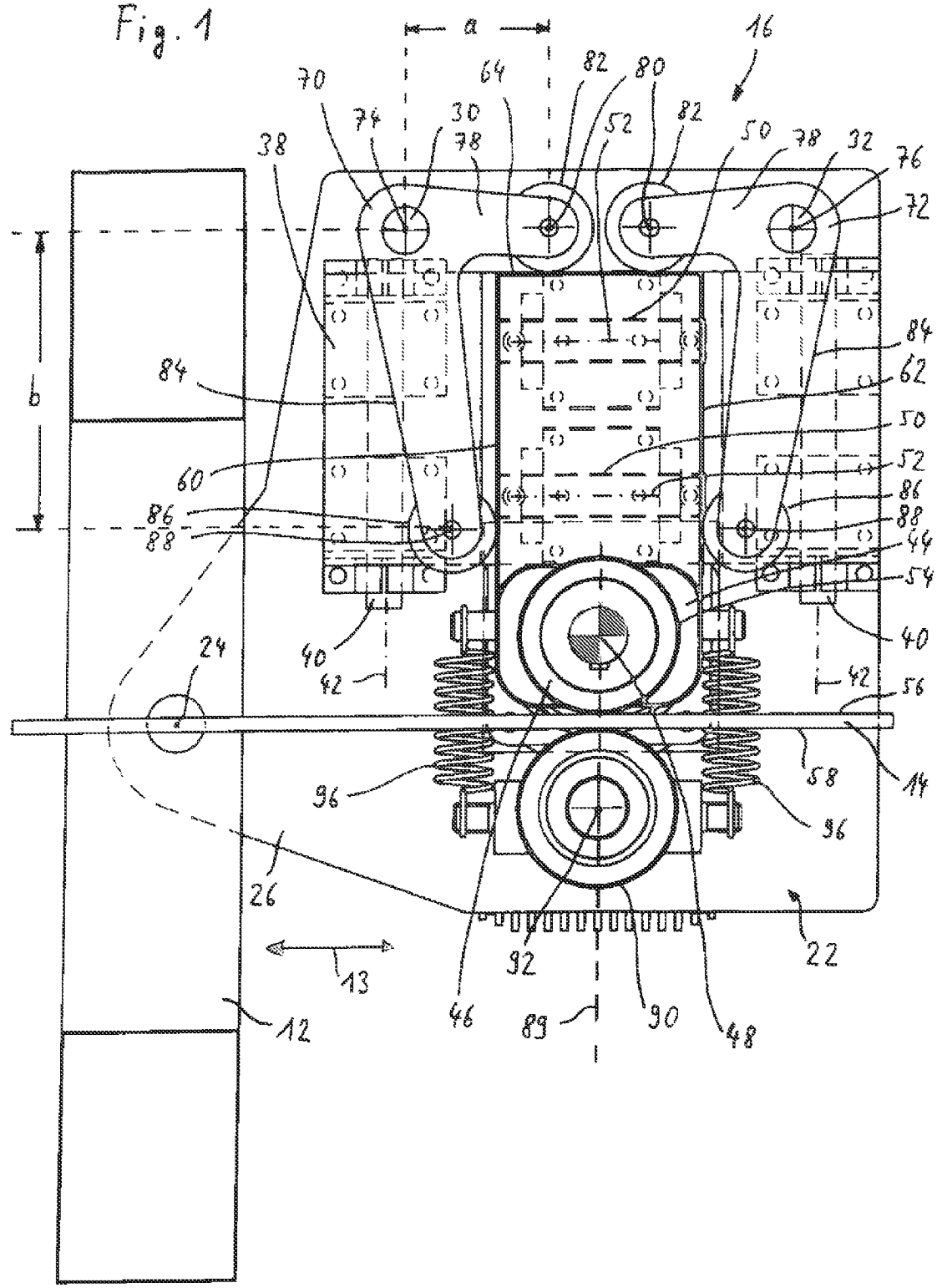
FIG. 1 shows a view of a first embodiment of the invention, seen from above.

FIG. 1 shows a view of a friction wheel drive of this kind, seen from above, where part of the frame 12 and the drive blade 14 are illustrated, which extends in the longitudinal direction 13.

A mount 22 is mounted on the frame 12 so as to be pivotable about a swivelling axis 24, which is vertical in this case, and which provides an alignment compensation between the drive blade 14 and the friction wheel drive. The mount 22 has a flat base plate 26, to which a further flat plate 28 is fixed, spaced apart from it and parallel to it. Extending between the plates 26, 28 are cylindrical journals 30, 32 and mounting brackets 34, 36.

On the lower plate 26, a carriage 38 is guided on two linear guides 40 arranged spaced apart and parallel to each other along axes of travel 42 relative to the plate 26. The two linear guides 40 form a first linear guide in this connection.

A bearing unit 44, on which a rotatably driven driving roller 46 is mounted so as to be rotatable about an axis of rotation 48, is guided on the carriage 38 along two linear guides 50, which form a second linear guide, so as to be longitudinally displaceable along axes of travel 52, the second linear guide 50 being aligned perpendicular to the first linear guide 40.

A drive motor 20 is disposed beneath the mount 22 and is in driving connection with the driving roller 46; it may be firmly joined to the bearing unit or arranged separately and may be connected to the driving roller via a rigid or flexible driving connection, such as a chain, belt or shaft drive.

A circumferential surface 54 of the driving roller 46 can be brought into engagement with a friction surface 56 forming an outer surface of the drive blade 14, the friction surface 56 being substantially parallel to the second linear guide 50 in operation.

The bearing unit 44 has two transmission surfaces 60, 62, which run parallel to one another and to the first linear guide 40, and a pressing surface 64, which runs perpendicular thereto and parallel to the second longitudinal guide 50.

Two two-armed pivot levers 70, 72 are mounted on the mount 22 on the journals 30, 32, which are fixed rigidly to the mount, so as to be pivotable about swivelling axes 74, 76 arranged perpendicular to the linear guides 40, 50 and parallel to the axis of rotation 48 of the driving roller 46. On the end of each first lever arm 78, there is a transmission roller 82, which is rotatable about the axis of rotation 80, a distance between the axis of rotation 80 and the swivelling axis 74 or 76 of the respective pivot lever being a. The transmission rollers 82 can roll on the pressing surface 64.

On the end of each second lever arm 84 of the pivot levers 70, 72, there is likewise a transmission roller 86, which is mounted so as to be rotatable about an axis of rotation 88 with a distance b between the respective swivelling axis 74, 76 of the respective pivot lever 70, 72 and which can roll on the transmission surface 60 or 62 facing the pivot lever concerned.

The lever arrangement 70, 72 is preferably symmetrical to a plane 89 including the axis of rotation 48 of the driving roller 46 and perpendicular to the friction surface 56, so that the pressing effect of the friction wheel drive is the same in both directions of drive.

Figure 5:
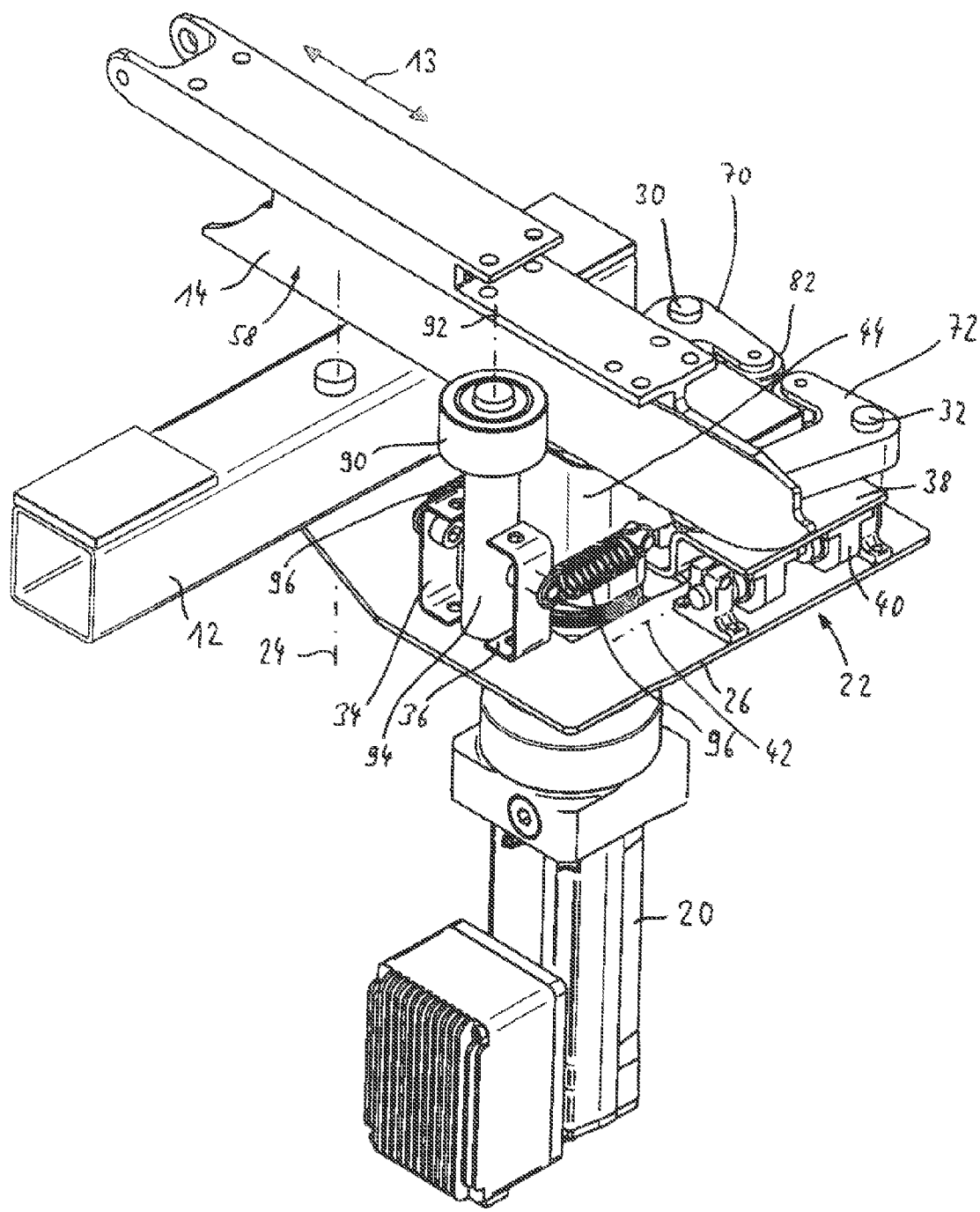
FIG. 5 shows a perspective view of the first embodiment from a different direction.

As is shown by FIG. 5 in particular, a pressure roller 90 forming a pressure member is provided, which is mounted on a journal 94 and runs freely about an axis of rotation 92 arranged parallel to the axis of rotation 48 of the driving roller 46. The journal 94 is firmly joined to the mount or the plates 26, 28, so that the axis of rotation 92 does not change position relative to the mount 22. Biased tension springs 96 are disposed between mounting brackets 34, 36, which are mounted on the mount 22 so that they do not change position, and the bearing unit 44 and in this way define a biasing force of the driving roller 46 towards the pressure roller 90.

In operation, when a carriage 2 moves in the longitudinal direction, the drive blade 14 enters the area between the driving roller 46 and the pressure roller 90 of a friction wheel drive 16, the rollers being biased against each other with a predetermined contact pressing force by means of a suitable choice of tension springs 96, so that friction forces in the linear guides etc. are overcome. Irrespective of any driving force, there is therefore already a force of the driving roller 46 which is directed orthogonally to the friction surface.

When the driving roller 46 is driven with a drive torque in a chosen direction of rotation (forwards or backwards), a reaction force which acts on the driving roller in the opposite direction to the driving force becomes effective parallel to the friction surface 56, i.e. parallel to the axes of travel 52 of the second linear guide 50, along which the bearing unit 44 is displaceable relative to the carriage 38. Depending on the remaining play, the elasticity of the driving roller 46, and the elasticity of the pressure roller 90 etc., the bearing unit 44 is displaced parallel to the friction surface under the effect of the reaction force described. In the process, one of the pivot levers 70, 72, which is located in the direction of the displacement movement, is swivelled about the swivelling axis 74 or 76 because of the contact between a second lever arm 84, or its transmission roller 86, and the transmission surface 60 or 62, so that the transmission roller 82 located at the end of the first lever arm 78 begins to press on the pressing surface 64 and moves the bearing unit 44 in a direction perpendicular to the friction surface 56 by a distance that results from the ratio a/b of the lengths of the lever arms between the first and second lever arms, or the effective lever arm length ratio, if the lever arms include an angle other than 90°.

The driving roller 46 is thus pressed against the friction surface with a contact pressing force that varies in strength depending on the driving force acting at any particular time and is roughly proportional to the driving force, as a result of which a considerable reduction in wear and an improvement in efficiency can be achieved compared to a contact pressing force that is permanently fixed. In particular, the automatic boosting of the contact pressing force acts in both directions, i.e. irrespective of the direction of drive.

Figure 6:
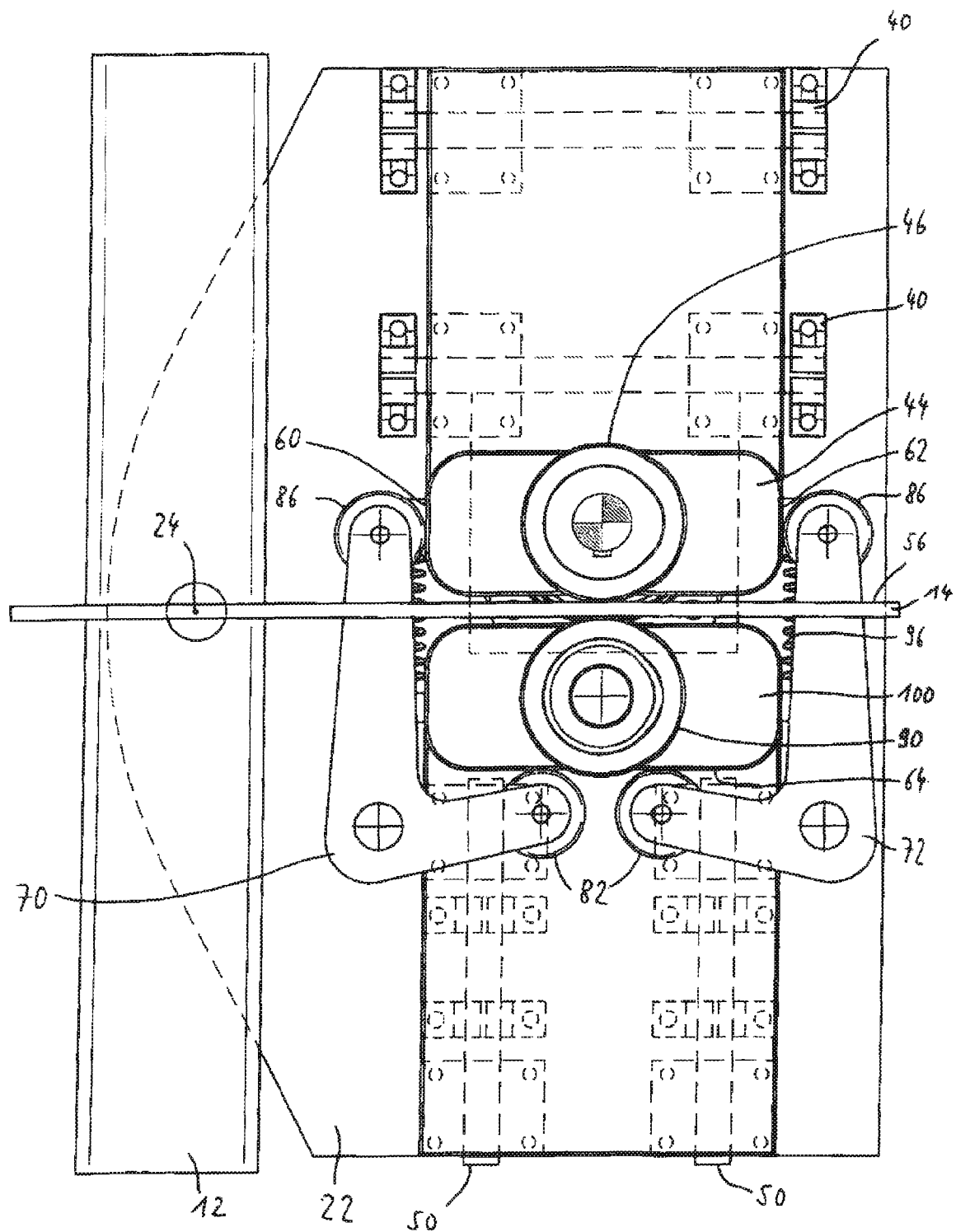
FIG. 6 shows a view of a second embodiment of the invention, seen from above.
Figure 7:
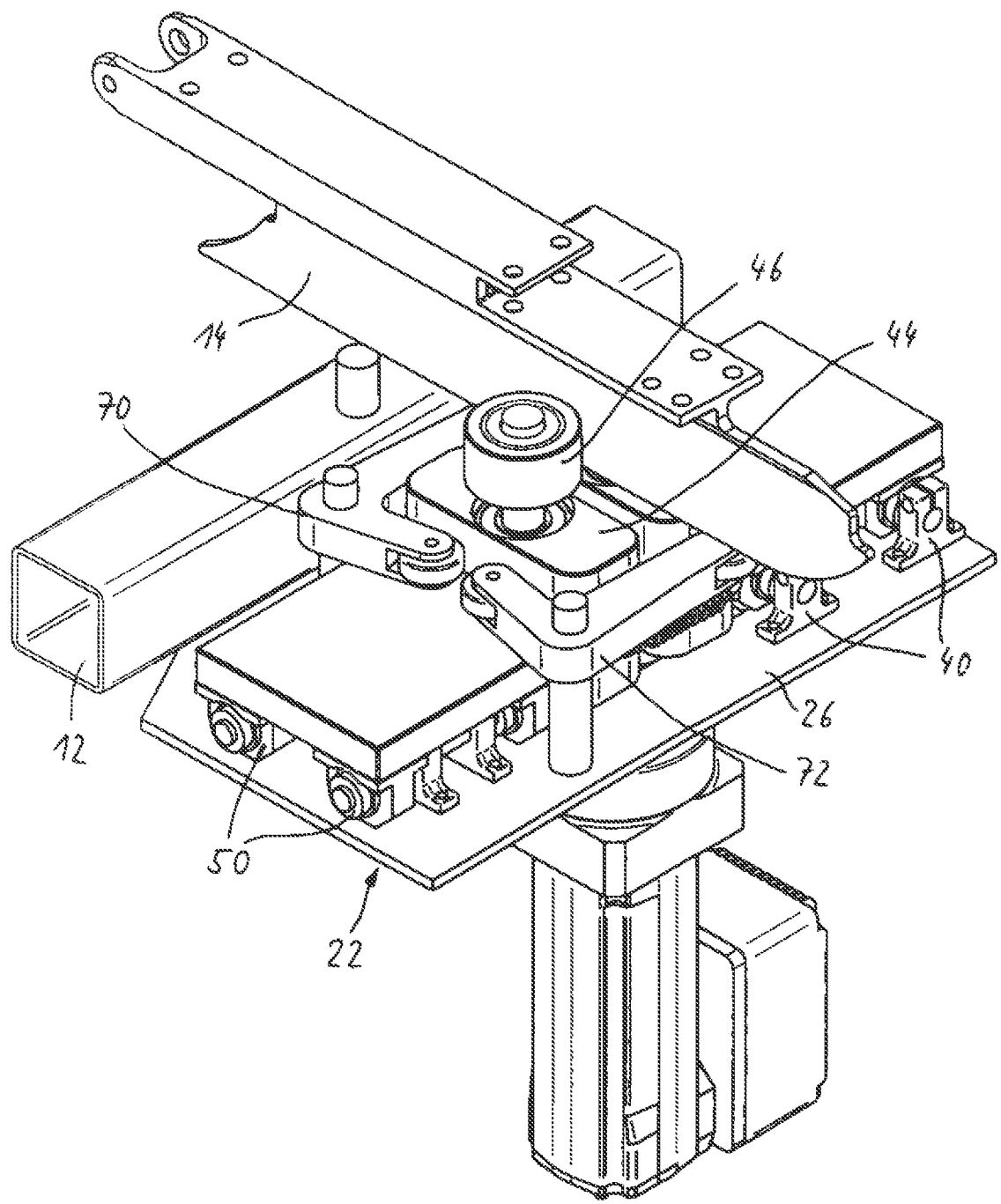
FIG. 7 shows a perspective view of the second embodiment from one direction.
Figure 8:
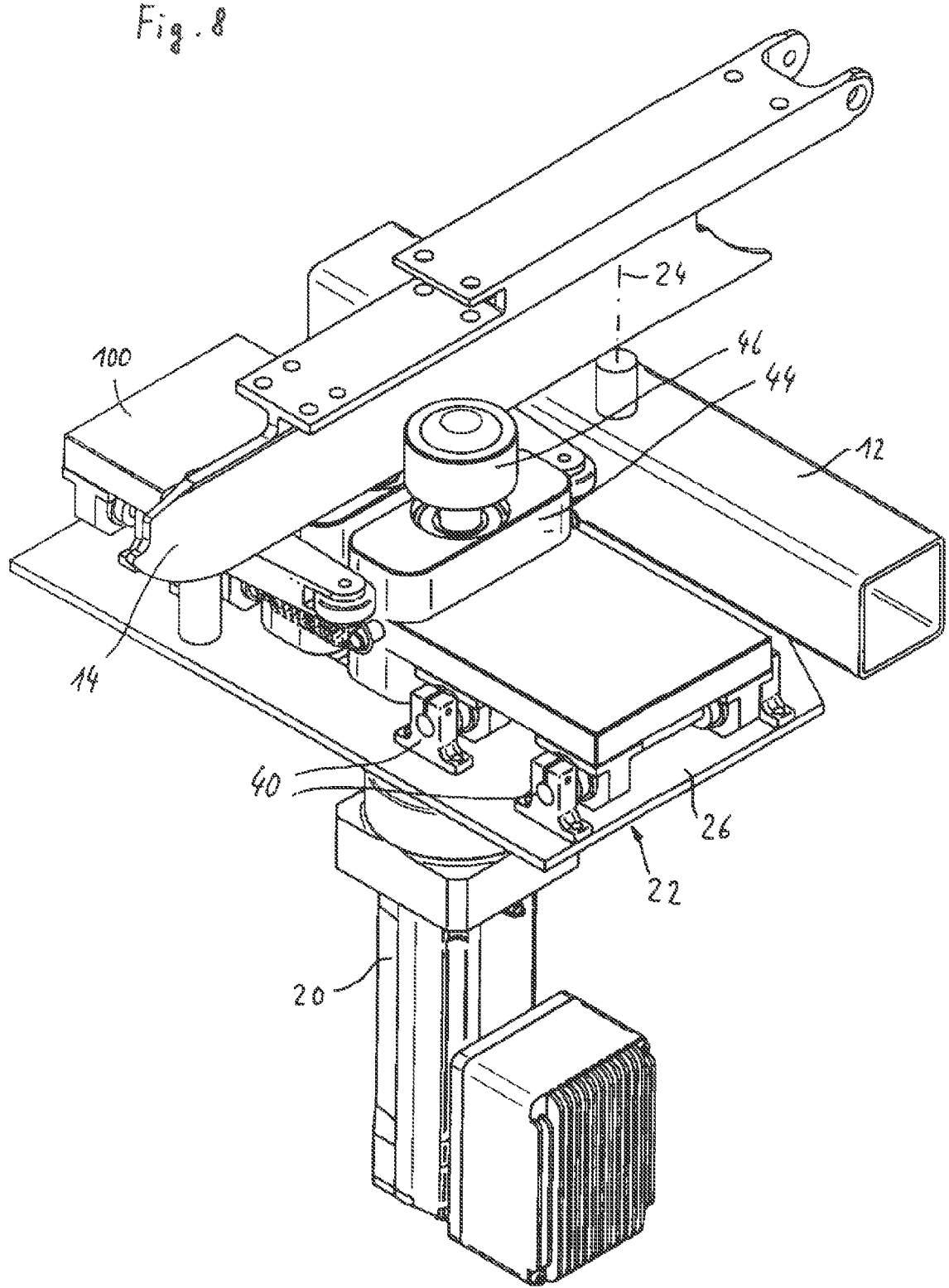
FIG. 8 shows a perspective view of the second embodiment from a different direction.

FIGS. 6 to 8 illustrate a second embodiment of the invention, in which the bearing unit 44 is mounted on a first linear guide 40, which is fixed to the mount 22 and is displaceable parallel to the friction surface 56, while a pressure body 100 carrying the pressure roller 90 is guided on a second linear guide 50, which is fixed to the mount 22 and is displaceable perpendicularly to the friction surface 56 and perpendicularly to the first linear guide 40. Between the bearing unit 44 and the pressure body 100, there are provided tension springs 96, which bias the two members against each other.

The transmission surfaces 60, 62 running perpendicularly to the friction surface are arranged to the side of the bearing unit 44 here, as with the first embodiment, whereas the pressing surface 64 running perpendicularly thereto is formed on the pressure body 100. Any displacement of the bearing unit 44 parallel to the friction surface caused by the reaction force generated when driving the driving roller 46 thus acts via the pivot levers 70, 72 to cause a relative movement of the pressure body 100 and thus of the pressure roller 90 perpendicularly to the friction surface towards the bearing unit 44, likewise irrespective of the direction of drive of the driving roller 46.

Figure 9:
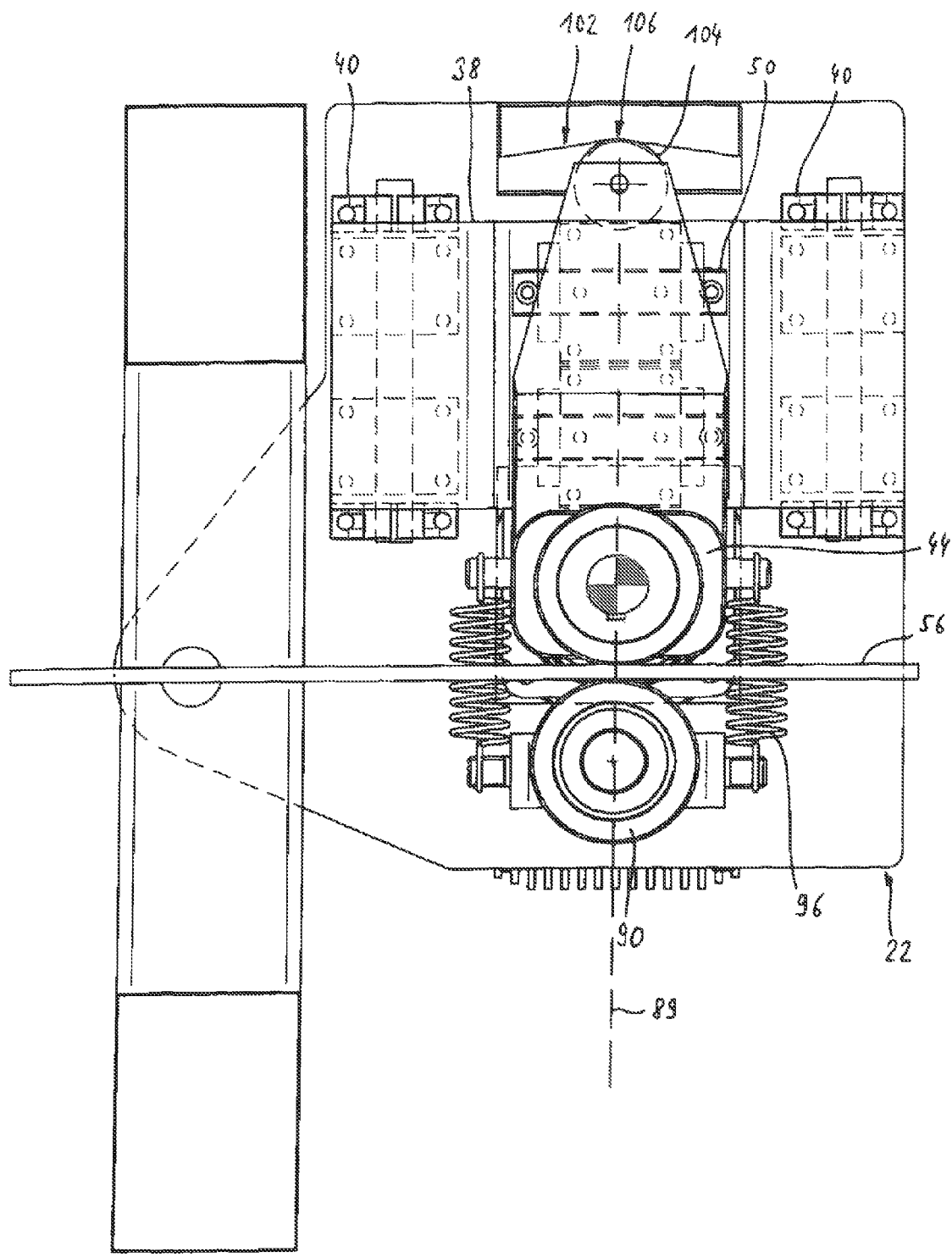
FIG. 9 shows a view of a third embodiment of the invention, seen from above.
Figure 10:
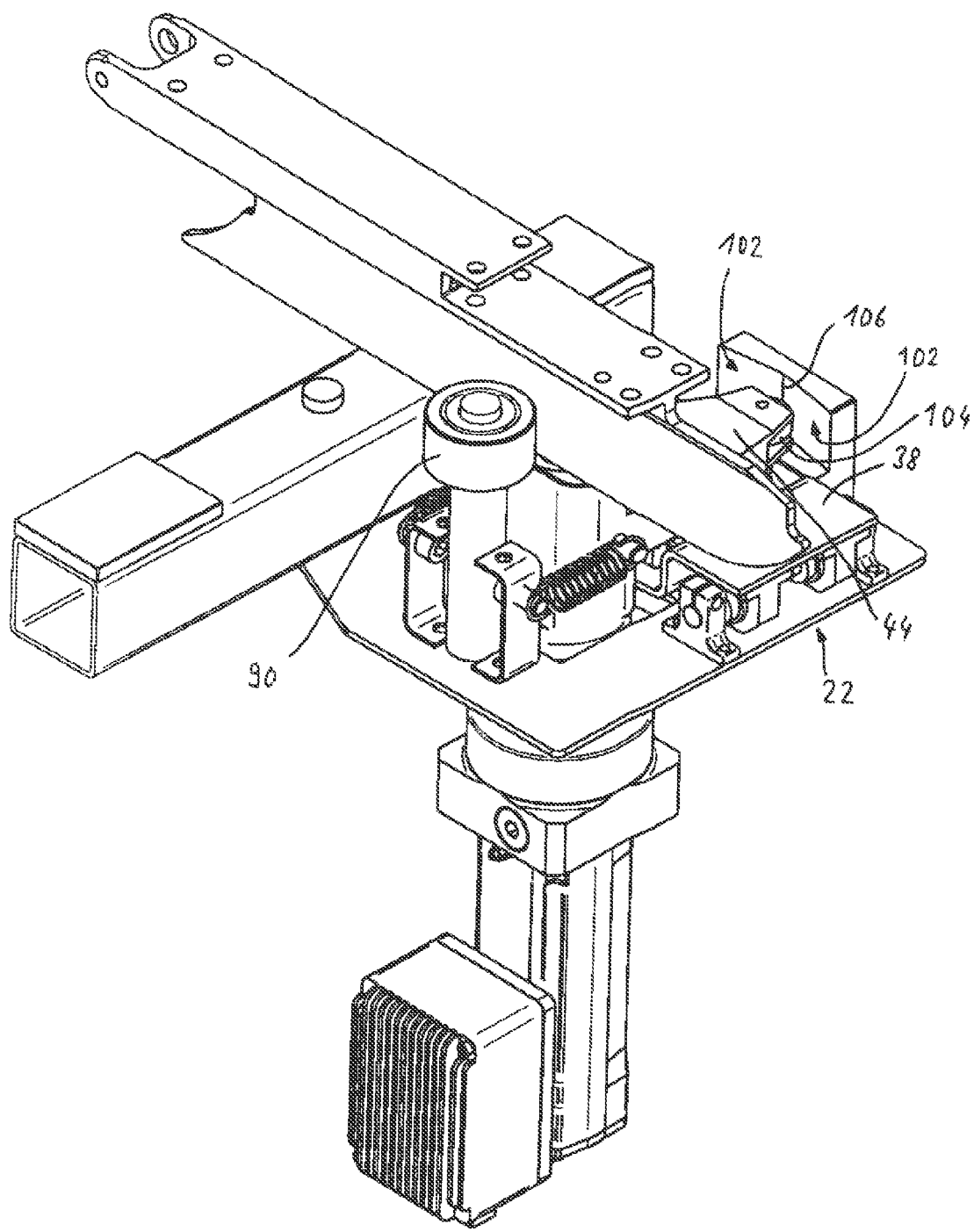
FIG. 10 shows a perspective view of the third embodiment.

FIGS. 9 and 10 illustrate a third embodiment of the invention, in which the arrangement of the pressure roller 90, bearing unit 44, carriage 38 and first and second linear guide 40, 50 corresponds to the first embodiment. Only the pivot levers 70, 72 are replaced by a V-shaped control surface 102 and a control roller 104 co-operating with it and rotatably mounted on the bearing unit 44. Proceeding from an apex 106 which is furthest away from the friction surface 56, the control surface 102 approaches the friction surface in both directions at a shallow angle, so that in the case of displacement parallel to the friction surface, the bearing unit 44 undergoes a corresponding, lesser movement towards the friction surface. The two regions of the control surface 102 on either side of the apex 106 are preferably symmetrical to the plane 89 and run at identical angles thereto, or to the friction surface, which corresponds to the identical, mirror-image design of the pivot levers 70, 72 from the embodiments described above and ensures that the pressing effect is the same in both directions. The angle at which the control surface, or its two regions on either side of the plane 89 or the apex 106, runs relative to the friction surface determines the relationship between the displacement parallel to the friction surface and the displacement perpendicular to the friction surface and thus also corresponds to the relationship between the contact pressing force and the reaction force.

Figure 11:
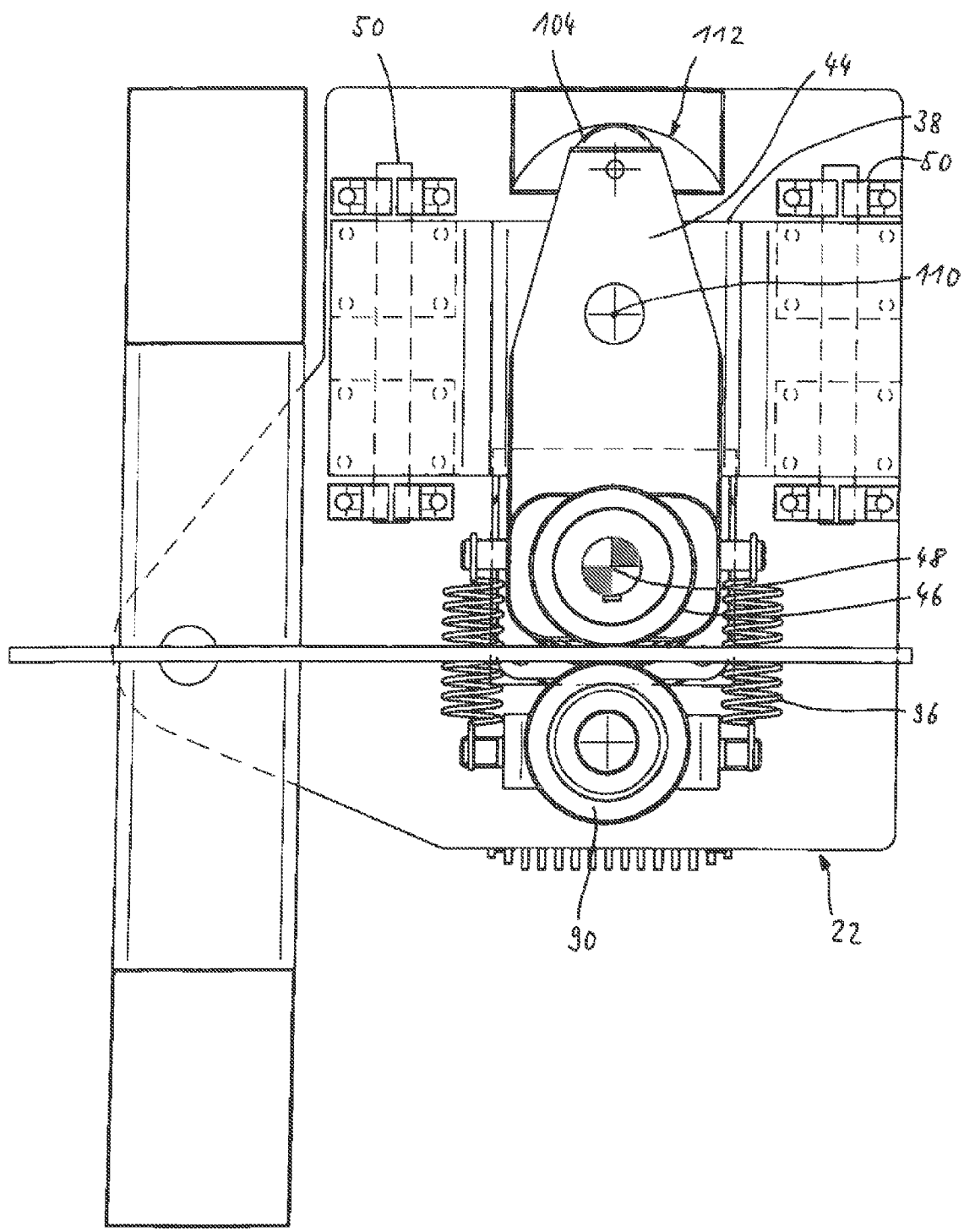
FIG. 11 shows a view of a fourth embodiment of the invention, seen from above.
Figure 12:
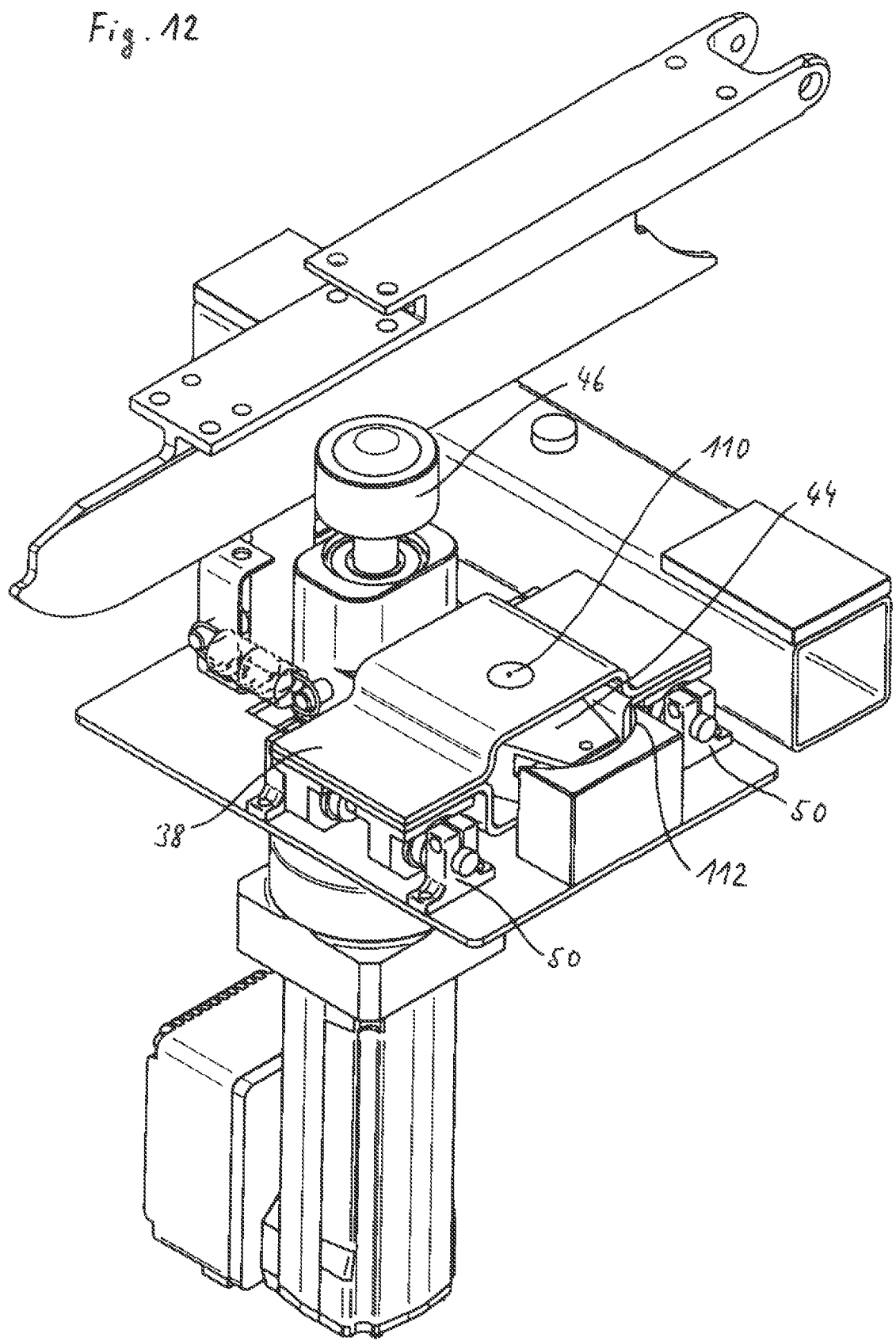
FIG. 12 shows a perspective view of the fourth embodiment.

FIGS. 11 and 12 show a fourth embodiment of the invention, the structure of which is similar to the third embodiment with regard to the control surface 102, though the bearing unit 44 is mounted not along a linear guide parallel to the friction surface, but rather on the carriage 38 about a swivelling axis 110 parallel to the axis of rotation 48 of the driving roller 46, which in turn is displaceably guided along a linear guide 50 arranged perpendicular to the friction surface. Tension springs 96 bias the bearing unit 44 on the carriage 38 towards a pressure roller 90 which is disposed in a fixed position relative to the mount 22.

Much the same as with the third embodiment, a control roller 104 is mounted on an end of the bearing unit 44 opposite the driving roller 46; it is rotatable about an axis of rotation parallel to the axis of rotation 48 of the driving roller 46 and can roll on a control surface 112 which is disposed in a fixed position relative to the mount 22. Unlike the control surface 102 of the third embodiment, the control surface 112 is arcuate in design, so that the local distance from the swivelling axis 110 of the bearing unit 44 is reduced constantly as the swivelling angle of the bearing unit increases, based on the initial position shown, where there is no driving force. The control surface 112 is shaped in such a way here that the axis of rotation 48 of the driving roller 46 is increasingly displaced towards the friction surface as the bearing unit 44 is increasingly deflected or swivelled about the swivelling axis 110.

Figure 13:
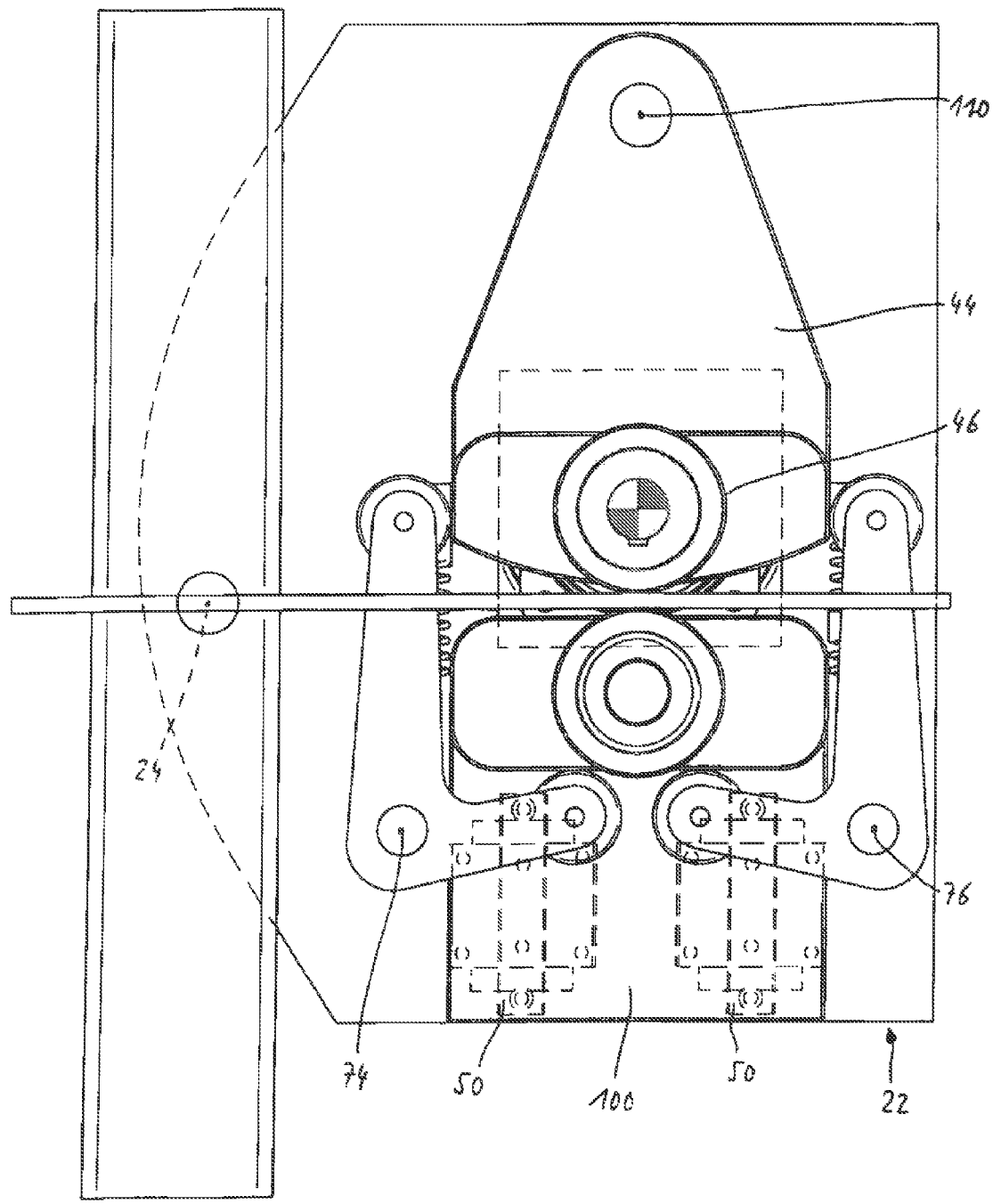
FIG. 13 shows a view of a fifth embodiment of the invention, seen from above.
Figure 14:
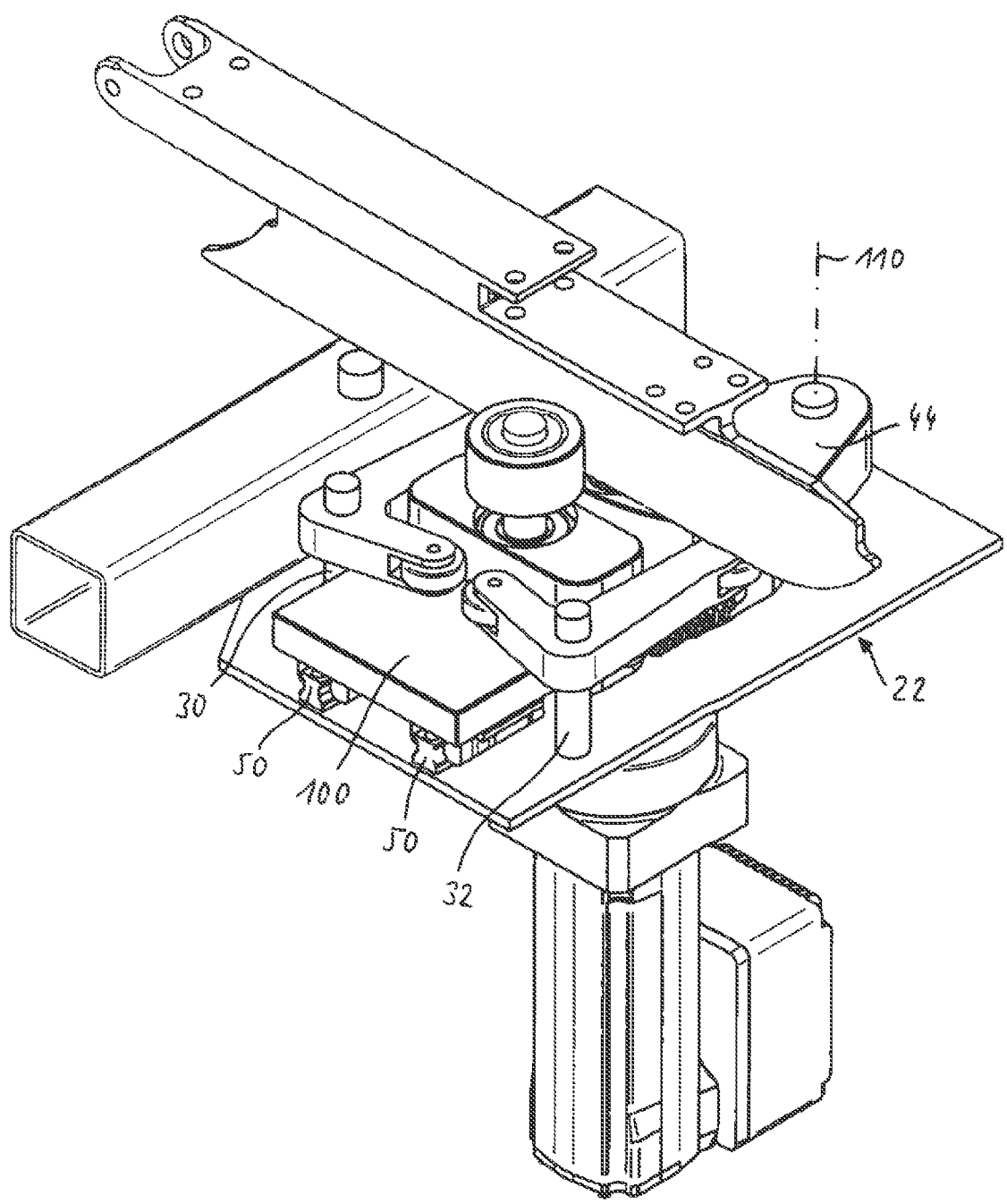
FIG. 14 shows a perspective view of the fifth embodiment.

FIGS. 13 and 14 show a fifth embodiment, in which the bearing unit 44, much the same as in the fourth embodiment, is hinged to the mount 22 about a swivelling axis 110 running parallel to the axis of rotation 48 of the driving roller 46. In other respects, the structure corresponds to the second embodiment according to FIGS. 6 to 8. It can be seen in this example that in the present connection, in principle any linear guide can be replaced by a swivel bearing, provided that the distance between the axis of rotation of the driving roller, or the axis of rotation of the pressure roller, and the respective swivelling axis must not be made too small, so that the movements which occur remain small relative to the swivelling radius. For this reason, it was, for example, possible in the fifth embodiment also to replace the linear guide 50, with which the pressure roller 90 is guided, by a swivel bearing, it being necessary for the swivel arm bearing the pressure body to extend by about 90° to the direction of movement of the linear guide. With small deflections, the displacement of the pressure roller is then approximately parallel to the linear guide of the fifth embodiment.

Figure 15:
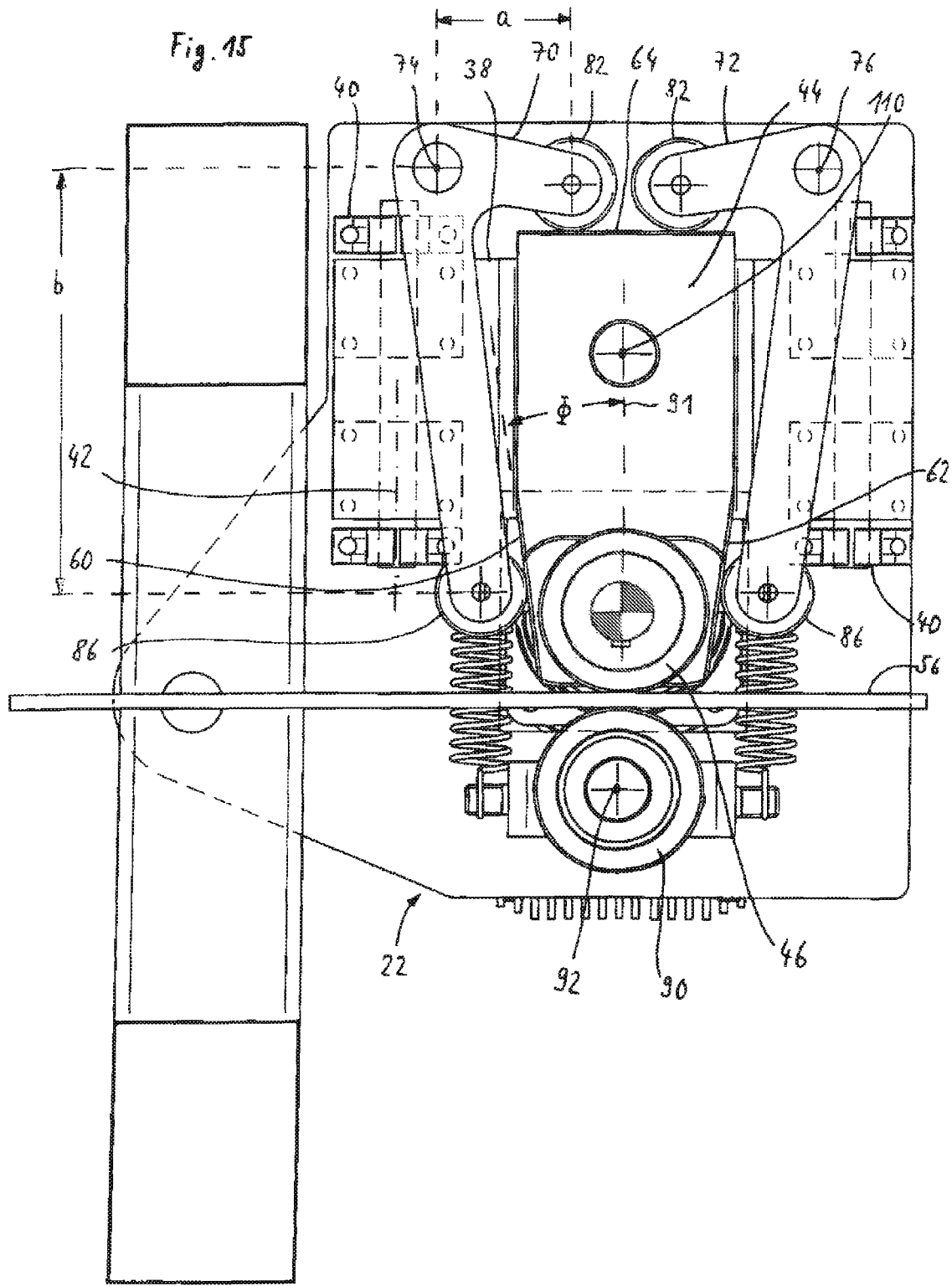
FIG. 15 shows a view of a sixth embodiment of the invention, seen from above.
Figure 16:
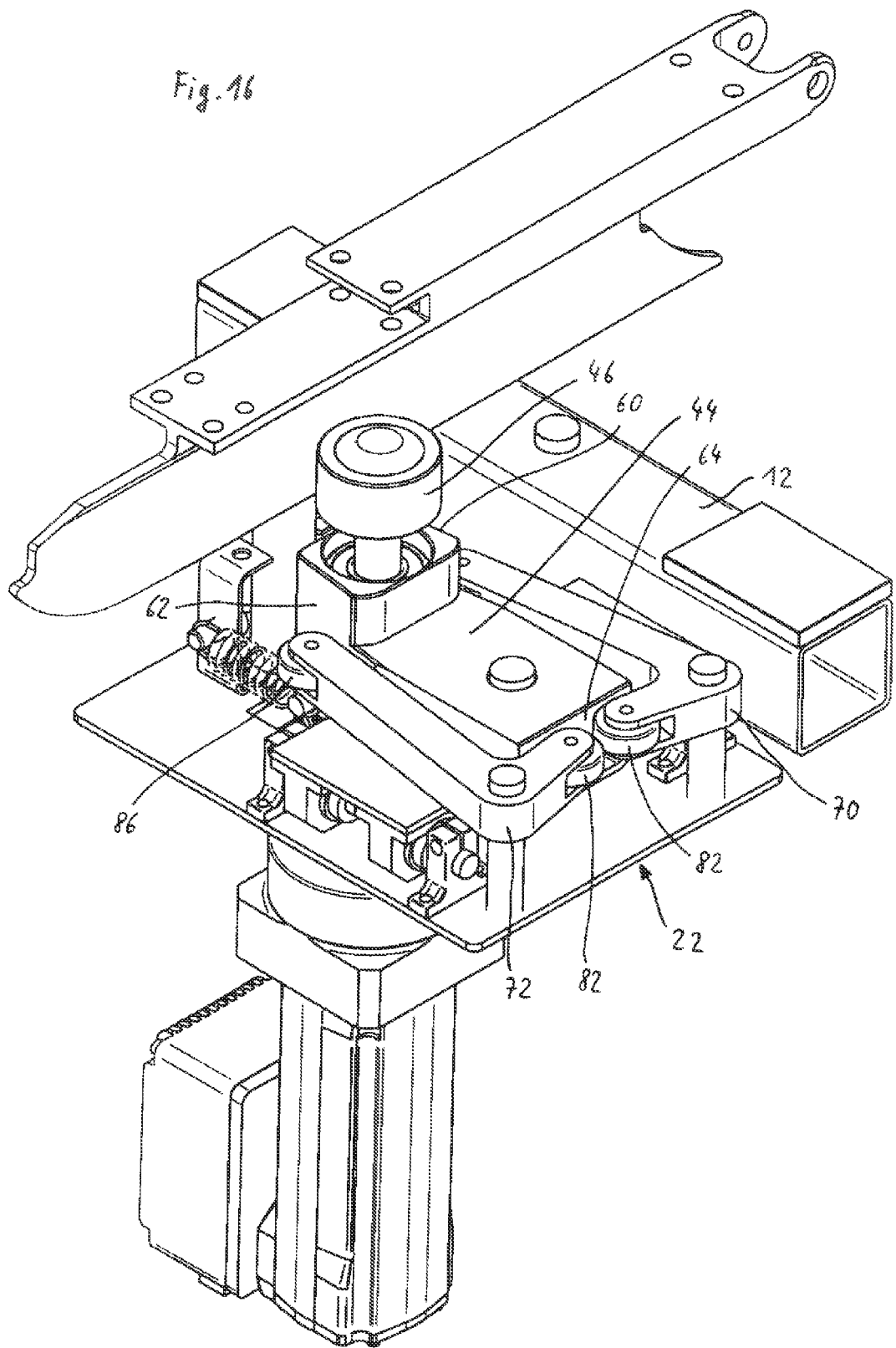
FIG. 16 shows a perspective view of the sixth embodiment from one direction.
Figure 17:
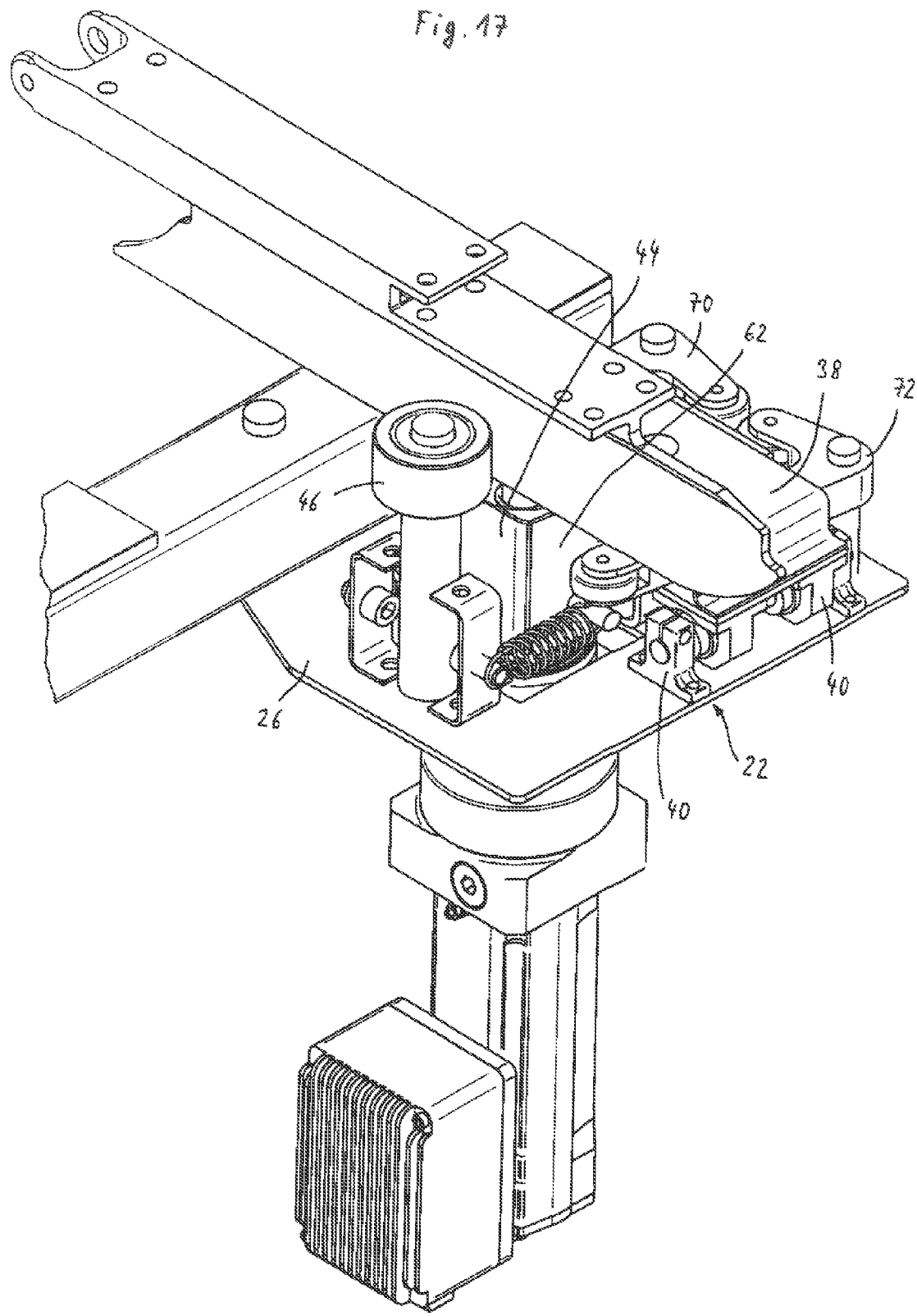
FIG. 17 shows a perspective view of the sixth embodiment from a different direction.

FIGS. 15 to 17 show a sixth embodiment of the invention, which is similar in structure to the first embodiment. Unlike the first embodiment, the second linear guide 50, with which the bearing unit 44 there is guided on the carriage 38, is replaced in the sixth embodiment by a swivel bearing with a swivelling axis 110 running parallel to the axis of rotation 48 of the driving roller, so that the bearing unit 44 is pivotable relative to the carriage 38, which can move along the axes of travel 42 of the first linear guide 40 perpendicularly to the friction surface 56. As in the first embodiment, the axis of rotation 92 of the pressure roller 90 and the swivel axes 74, 76 of the pivot lever 70, 72 are attached in a fixed position relative to the mount 22.

The transmission surfaces 60, 62 are not parallel to one another and perpendicular to the friction surface 56, as is the case in the first, second and fifth embodiments, but are instead arranged in a V shape, in each case at an angle to a plane 91 which includes the axis of rotation 48 of the driving roller 46 and the swivelling axis 110. The angle referred to, indicated by O in FIG. 15, corresponds to the arc tan value of the length ratio a/b of the lever arms of the pivot levers 70, 72, which results in an automatic adjustment when the driving roller 46 suffers wear. Wear corresponds to a reduction in the diameter of the driving roller 46, so that the tension springs 96 cause the bearing unit 44 to move correspondingly further towards the pressure roller 90 than is shown in FIG. 15. In the process, the angle of inclination of the transmission surfaces 60, 62, which is adapted to the lever arm length ratio, ensures that no additional play occurs between the transmission surfaces 60, 62 and the transmission rollers 86 or between the pressing surface 64 and the transmission rollers 82.

This kind of automatic adjustment effect thanks to transmission surfaces arranged in a V or wedge shape can also be implemented in the second and fifth embodiments.

Figure 18:
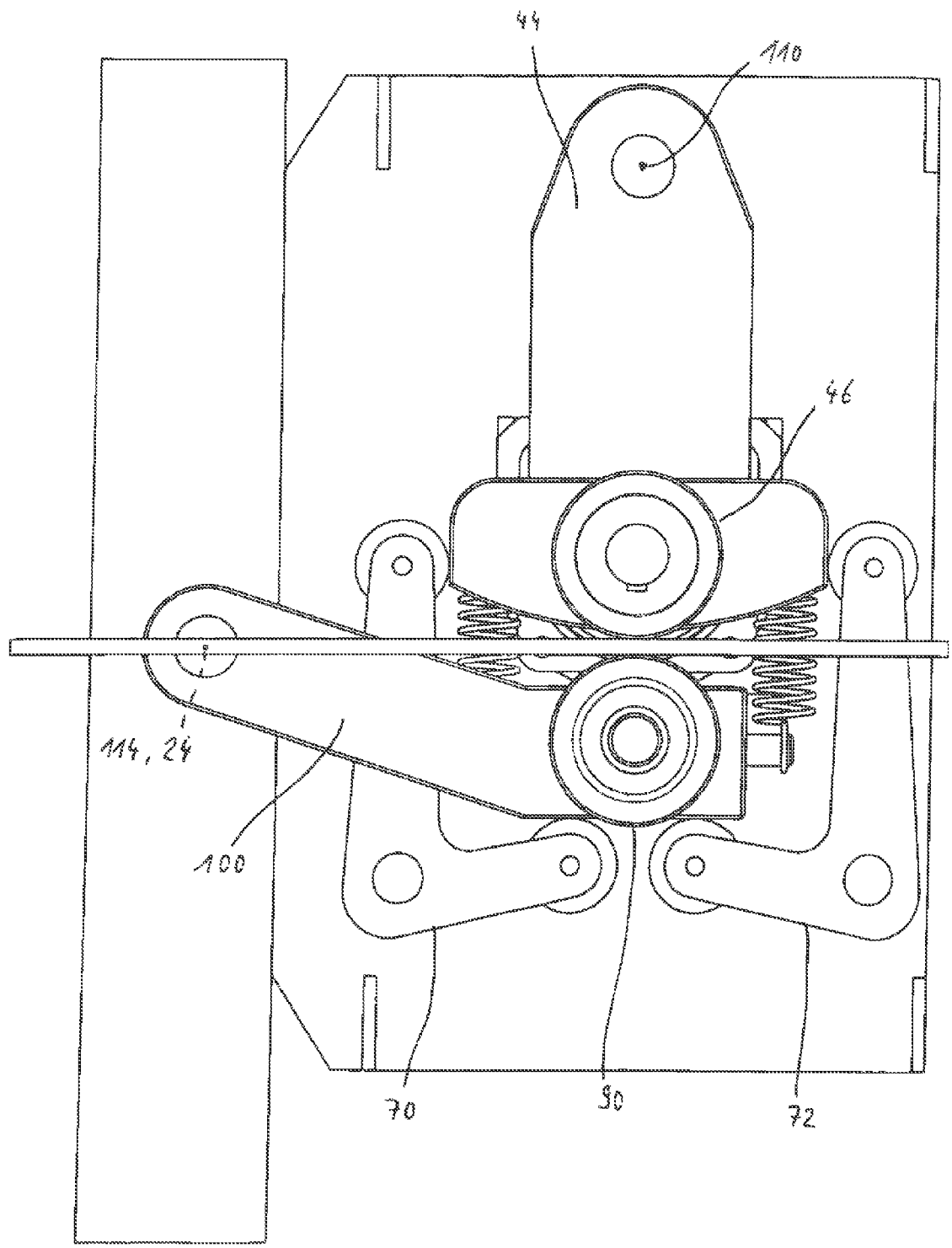
FIG. 18 shows a view of a seventh embodiment of the invention, seen from above.
Figure 19:
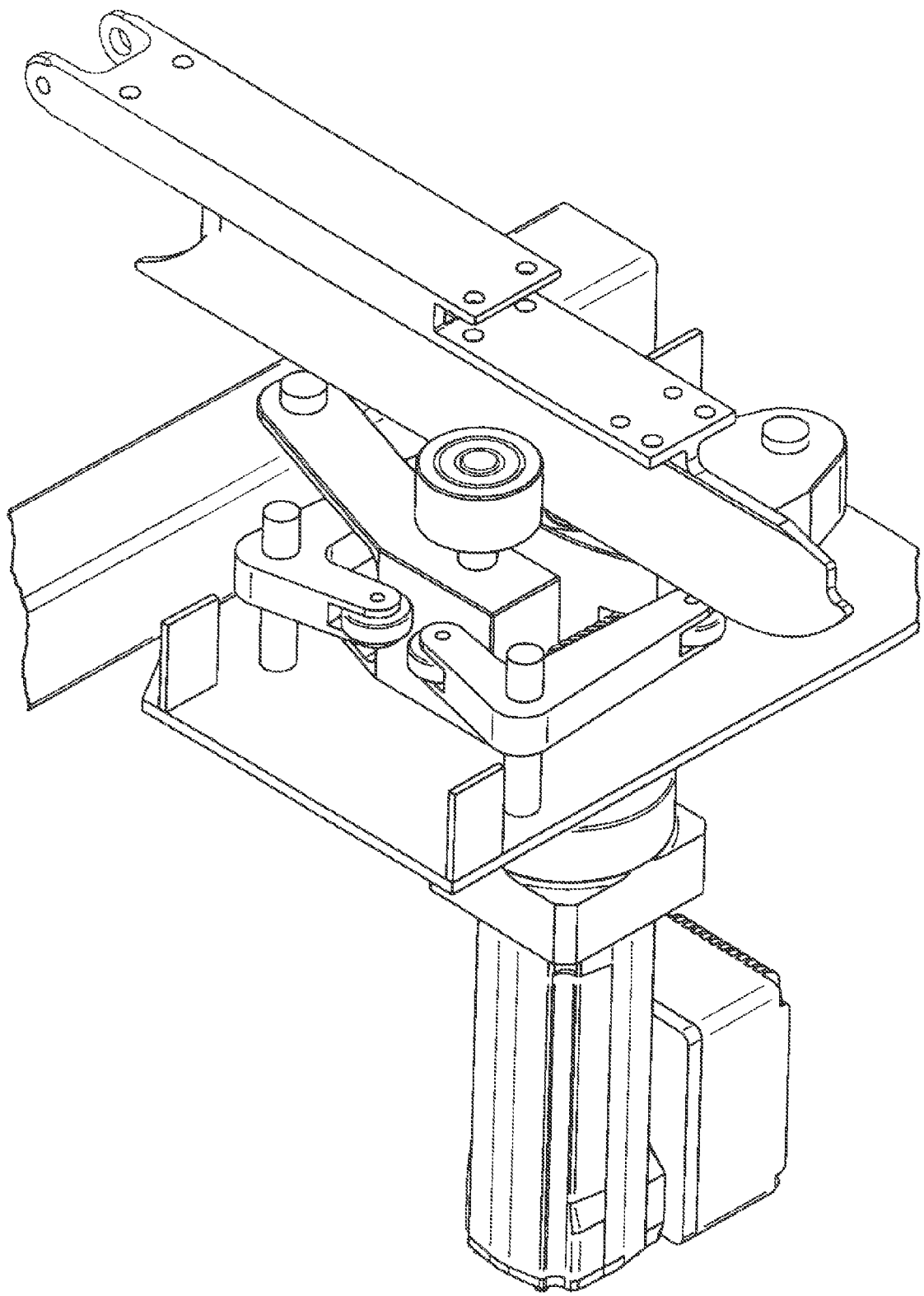
FIG. 19 shows a perspective view of the seventh embodiment.

FIGS. 18 and 19 illustrate a seventh embodiment of the invention, which shows an example of how it is possible to dispense with linear guides completely. This embodiment is similar to the fifth embodiment according to FIG. 13, with the difference that the pressure body 100 bearing the pressure roller 90 is not mounted on a linear guide which is displaceable perpendicularly to the friction surface, but is instead mounted so as to be pivotable about a further swivelling axis 114, which runs parallel to the swivelling axis 110 about which the bearing unit 44 is pivotally mounted. In this embodiment, the further swivelling axis 114 advantageously coincides with the swivelling axis 24, about which the mount 22 is pivotally mounted on the frame 12 for the purpose of alignment compensation.

Figure 20:
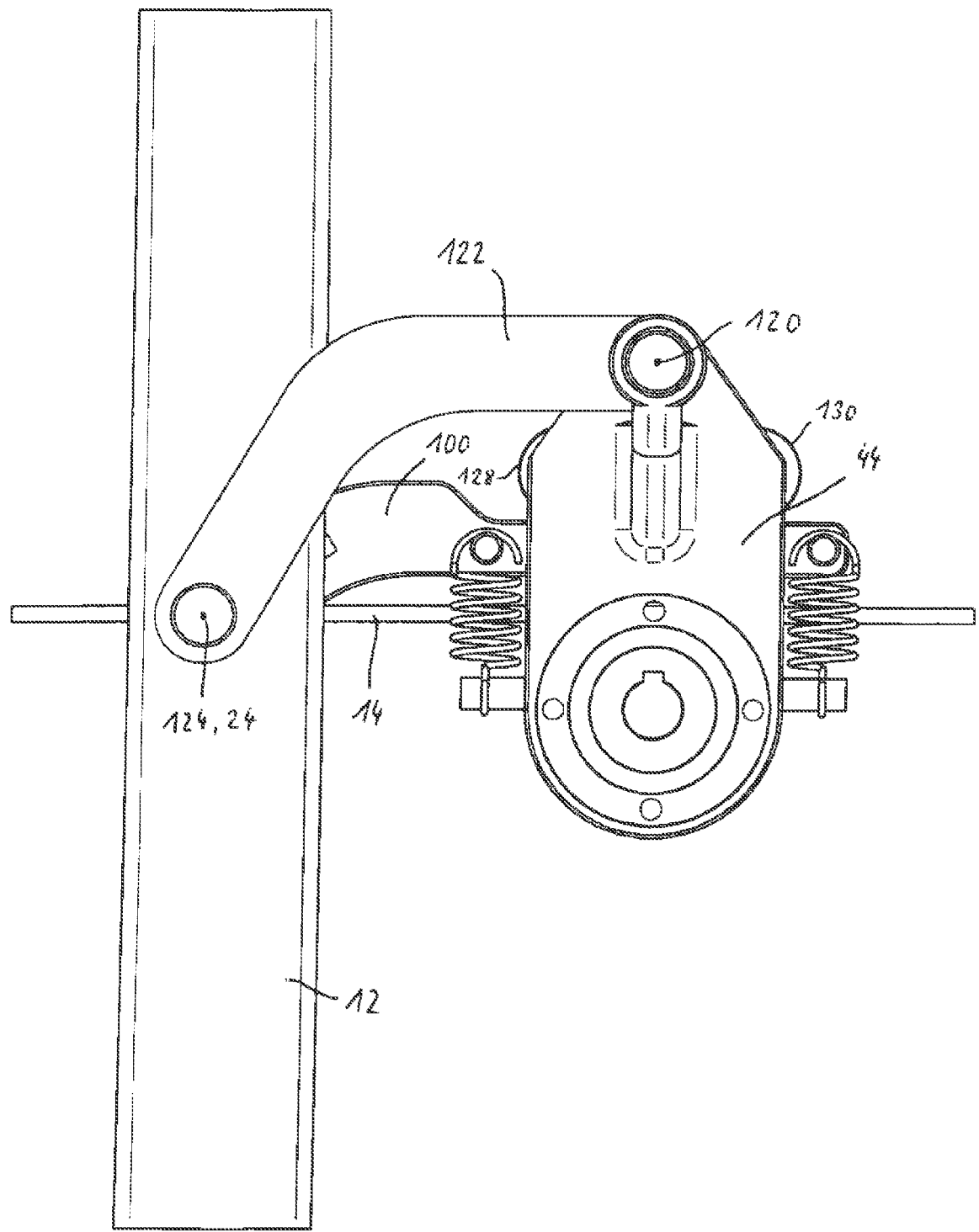
FIG. 20 shows a view of an eighth embodiment of the invention, seen from above.
Figure 21:
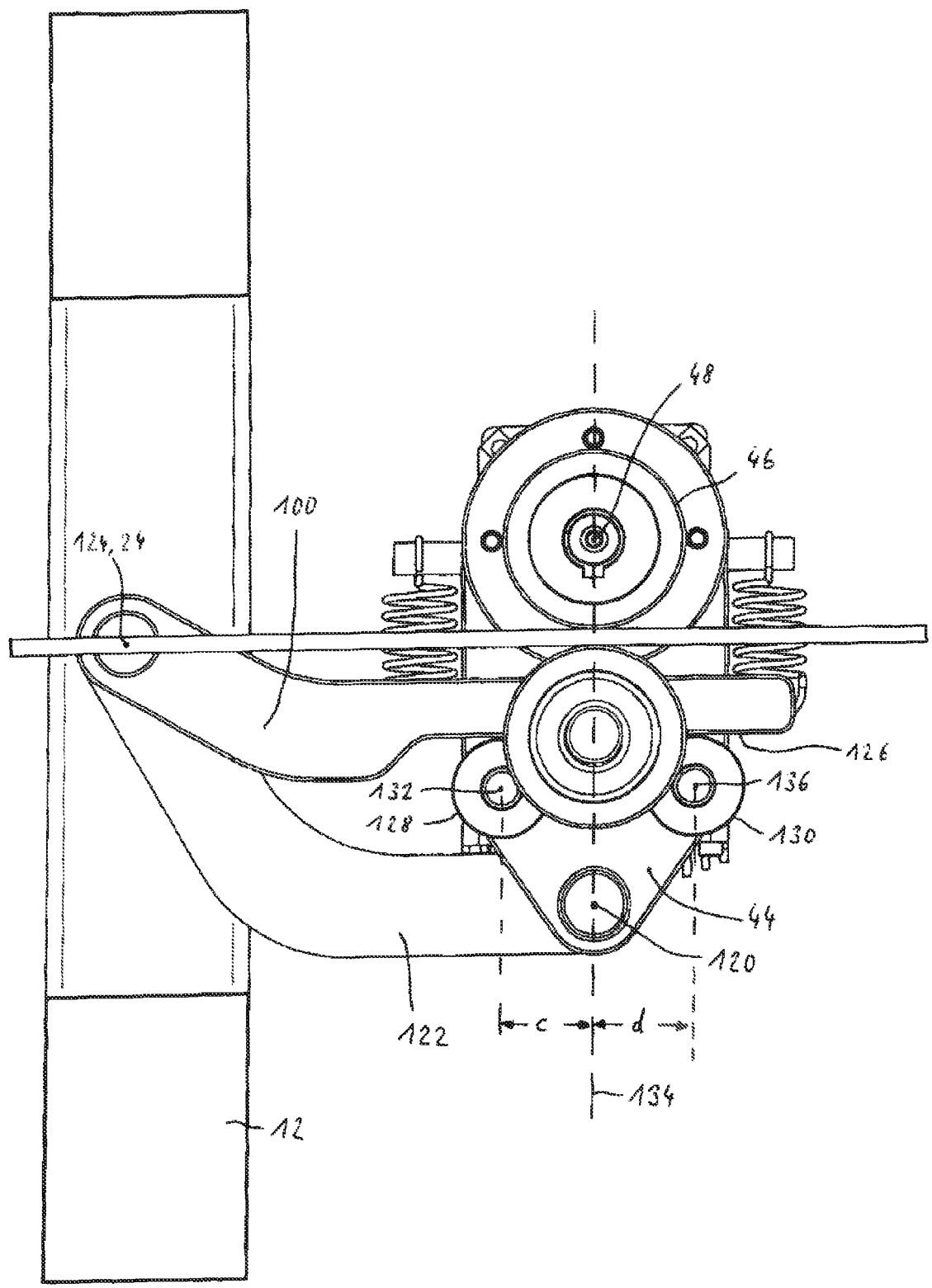
FIG. 21 shows a view of the eighth embodiment, seen from above from the opposite direction.
Figure 22:
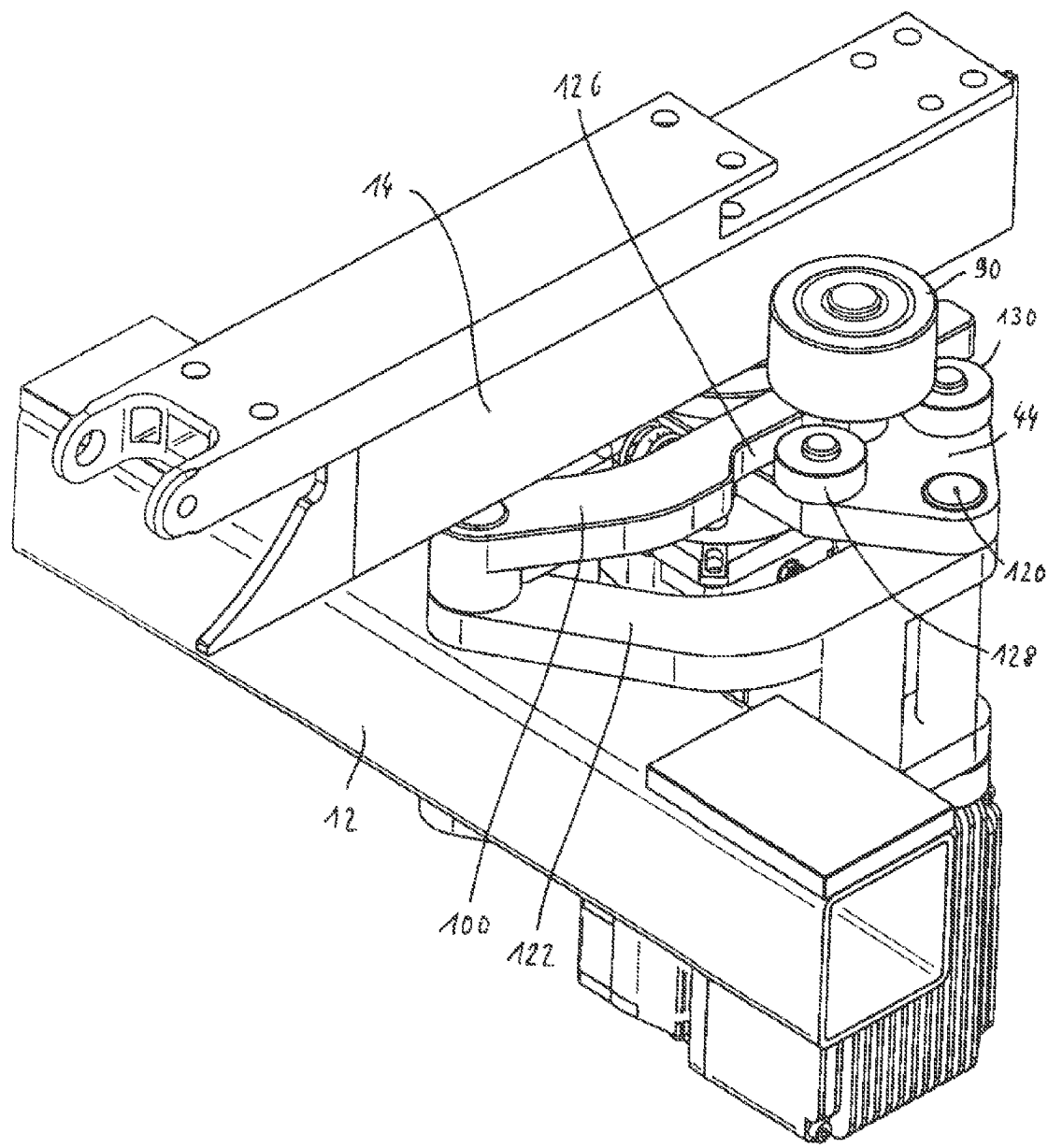
FIG. 22 shows a perspective view of the eighth embodiment.

FIGS. 20 to 22 show an eighth embodiment of the invention, which differs from the embodiments described above in that the bearing unit 44 is mounted on a mounting arm 122, together with the driving roller 46 and drive motor 20, so as to be pivotable about a swivelling axis 120, which in turn is mounted on the frame 12 so as to be pivotable about a swivelling axis 124. No mount is required here. The swivelling axis 124 corresponds to the swivelling axis 24 and provides for an alignment compensation if the position of the friction-drive body 14 deviates to one side. A pressure roller 90 is mounted on a pressure body 100, which takes the form of a swivel arm, which is likewise mounted on the frame 12 so as to be pivotable about the swivelling axis 124. The pressure body 100 has a lateral pressure surface 126, against which a first or second pressure roller 128, 130 can rest. The pressure rollers 128, 130 are rotatably mounted on the bearing unit 44. A first axis of rotation 132 of the first pressure roller 128 is a first distance c from a central plane 134 including the axis of rotation 48 of the driving roller 46 and the swivelling axis 120 of the bearing unit 44, while a second axis of rotation 134 of the second pressure roller 130 is a distance d from the central plane 134. The distances c, d are not the same in the embodiment illustrated, but are selected such that when there is a (slight) swivelling movement of the bearing unit 44 about the swivelling axis 120, which is caused by a driving force introduced by the driving roller in one direction or the other, the pressure body 100 is pressed by the first or second pressure roller 128, 130—with the same force as far as possible—against the counter-surface 58 of the friction-drive body 14, so that the different distance between the pressure points at which the first and second pressure rollers some into contact with the pressure surface 126 is compensated by the swivelling axis 124.

In operation, because of the drive of the driving roller 46 and its contact with the drive blade or friction-drive body 14, the bearing unit 44 is subject to a swivelling moment about the swivelling axis 120 and a more or less slight deflection, so that, depending on the drive direction, the first or second pressure roller 128, 130 comes to rest against the pressure surface 126, and moves the mounting arm 122 about the swivelling axis 124 against the counter-surface 58, so that both the driving roller 46 and the pressure roller 90 are each pressed with the same orthogonal force against the friction surface 56 or the counter-surface 58 respectively.

It is expedient for the distance c to be made smaller than the distance d, because the first pressure roller 128 associated with the distance c acts on a shorter lever length of the mounting arm 122 than the second pressure roller 130 associated with the distance d, so that this ultimately ensures that the pressing force of the pressure roller 90 and driving roller 46 is the same for both drive directions of the driving roller 46, based on the same driving moment of the driving roller in each case.

The relationships in the transmission of the frictional force in the form of a driving force of the driving roller acting tangentially to the friction surface cannot be equated to normal static or sliding friction, so that Coulomb's law of friction (friction force as the product of the coefficient of friction and perpendicular force) does not apply unchanged. The tangential transmission of force between a driving roller and a friction surface presupposes that slip occurs between them. The contact area can be divided up into an adhesion region and a sliding region, with the share of the sliding region growing as the driving force increases and the perpendicular force remains constant.

Figure 23:
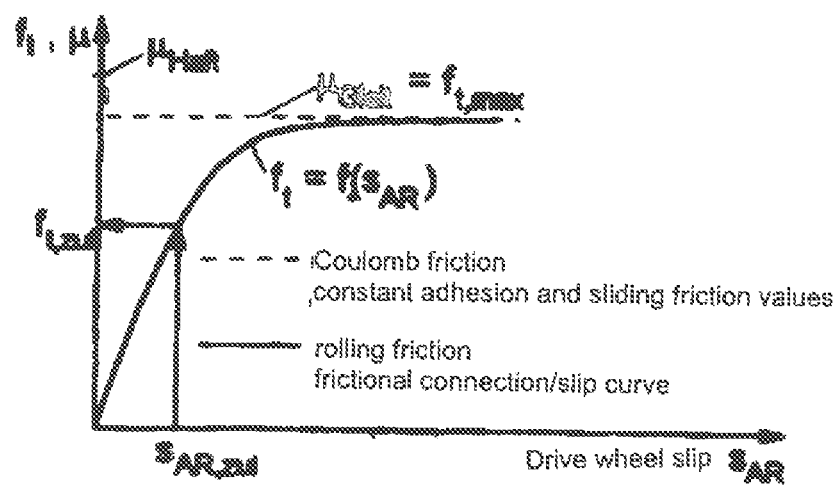
FIG. 23 illustrates the link between the frictional connection and slip.

The behaviour of a friction wheel drive is characterised by the frictional connection/slip curve $f_t = f(sAR)$ shown in FIG. 23, where the frictional connection describes the ratio of transmitted driving force to perpendicular force, $f_t = F_A/F_N$, and the slip is defined as the difference in speed between the circumferential speed of the driving roller and the speed of the friction-drive body, based on the circumferential speed of the driving roller: VAR $$S_{AR} = (V_{AR} - V_k)/(V_{AR}).$$

If the transmitted driving force increases while the perpendicular force remains constant, the slip also increases. When the slip is great, the tangential frictional connection and coefficient of sliding friction are the same, and from this it is possible to establish the theoretically maximum transmissible driving force as the product of the perpendicular force and the coefficient of sliding friction.

If the frictional connection-slip curve is known for a given pair of materials, then for the permissible boundary slip $S_{AR, zul}$, the frictional connection $f_{t, zul}$ corresponding to that slip can be found. This makes it possible to determine the transmissible driving force for a given perpendicular force, which may be limited for design reasons for example, and that transmissible driving force may perhaps be exceeded for a short time.

Proportional pressing between the driving roller and the friction surface, which can be achieved with the invention, means a linear increase in the perpendicular force together with the driving force with a constant frictional connection, e.g. $f_t = 0.5$, and hence also constant slip.

| List of reference numerals | |
|---|---|
| 2 | Carriage |
| 4 | Chassis |
| 6 | Support roller |
| 8 | Guide roller |
| 10 | Guide rail |

-continued

| List of reference numerals | |
|---|---|
| 12 | Frame |
| 13 | Longitudinal/conveying direction |
| 14 | Drive blade (friction drive body) |
| 16 | Friction wheel drive |
| 20 | Drive motor |
| 22 | Mount |
| 24 | Swivelling axis |
| 26, 28 | Plate |
| 30, 32 | Journal |
| 34, 36 | Mounting brackets |
| 38 | Carriage |
| 40 | First linear guide |
| 42 | Axis of travel |
| 44 | Bearing unit |
| 46 | Briving roller |
| 48 | Axis of rotation |
| 50 | Second linear guide |
| 52 | Axis of travel |
| 54 | Circumferential surface |
| 56 | Friction surface |
| 58 | Counter-surface |
| 60, 62 | Transmission surfaces |
| 64 | Pressing surface |
| 70, 72 | Pivot lever |
| 74, 76 | Swivelling axis |
| 78 | First lever arm |
| 80 | Axis of rotation |
| 82 | Transmission roller |
| 84 | Second lever arm |
| 86 | Transmission roller |
| 88 | Axis of rotation |
| 89 | Plane |
| 90 | Pressure roller (pressure member) |
| 91 | Plane |
| 92 | Axis of rotation |
| 94 | Journal |
| 96 | Tensioning screw |
| 100 | Pressure body |
| 102 | Control surface |
| 104 | Control roller |
| 106 | Apex |
| 110 | Swivelling axis |
| 112 | Control surface |
| 114 | Further swivelling axis |
| 120 | Swivelling axis |
| 122 | Mounting arm |
| 124 | Swivelling axis |
| 126 | Pressure surface |
| 128 | First pressure roller |
| 130 | Second pressure roller |
| 132 | First axis of rotation |
| 134 | Central plane |
| 136 | Second axis of rotation |
| a | Distance 80-74, 76 |
| b | Distance 88-74, 76 |
| c | Distance 132, 134 |
| d | Distance 136, 134 |
| Φ | Angle between 60, 62 and 91 |

What is claimed is:

1. A friction wheel drive comprising:

a friction wheel drive having a driving roller capable of being driven in a rotary manner, the driving roller being mounted on a bearing unit so as to be rotatable about an axis of rotation, wherein the bearing unit is displaceably guided transversely to the axis of rotation, and a circumferential surface of the driving roller can be brought into driving engagement with a friction surface;

the bearing unit being coupled to a first mechanical forced guidance system, by which the driving roller, responding to a driving force acting in a first direction, can be pressed automatically against the friction surface with a contact pressing force that increases as the driving force increases; and wherein the bearing unit is coupled to a second mechanical forced guidance system, by which the driving roller, responding to a driving force acting in an opposite second direction, can be pressed automatically against the friction surface with a contact pressing force that increases as the driving force increases; and the first and second mechanical forced guidance systems simultaneously and automatically producing a displacement of the bearing unit in the direction of the friction surface, independently of the direction of drive, upon displacement of the bearing unit parallel to the friction surface.

2. The friction wheel drive according to claim 1, wherein the bearing unit is pivotably mounted on a mounting arm, the mounting arm being pivotably mounted on a frame at a swivelling axis.

3. The friction wheel drive according to claim 2, wherein a pressure roller is mounted on a pressure body pivotably mounted on the frame.

4. The friction wheel drive according to claim 3, wherein pressure rollers are rotatably mounted on the bearing unit, the pressure rollers pressing against a pressure surface of the pressure body upon pivoting motion of the bearing unit relative to the mounting arm.

5. The friction wheel drive of claim 4, wherein a first axis of rotation of a first pressure roller is a first distance from a central plane, the central plane including the axis of rotation of the driving roller and a swivelling axis of the bearing unit, and a second axis of rotation of a second pressure roller is a second distance from the central plane, the first and second distances being selected such that when a driving force in either direction is applied to the driving roller, the first or second pressure roller exerts a pressure force upon the pressure body that is independent of the direction of the driving force.

6. The friction wheel drive of claim 5, wherein the first distance is less than the second distance, the first pressure roller being closer to the swivelling axis of the mounting arm than the second pressure roller.

\* \* \* \* \*